(12) United States Patent
Seo et al.

(10) Patent No.: US 9,781,623 B2
(45) Date of Patent: *Oct. 3, 2017

(54) METHOD AND DEVICE FOR MEASURING A DOWNLINK IN A WIRELESS COMMUNICATION SYSTEM

(71) Applicant: LG ELECTRONICS INC., Seoul (KR)

(72) Inventors: Hanbyul Seo, Anyang-si (KR); Daewon Lee, Anyang-si (KR); Byounghoon Kim, Anyang-si (KR); Kijun Kim, Anyang-si (KR); Inkwon Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 60 days.

This patent is subject to a terminal disclaimer.

(21) Appl. No.: 14/660,655

(22) Filed: Mar. 17, 2015

(65) Prior Publication Data

US 2015/0189531 A1 Jul. 2, 2015

Related U.S. Application Data

(63) Continuation of application No. 13/884,533, filed as application No. PCT/KR2011/008894 on Nov. 22, 2011, now Pat. No. 9,008,675.

(Continued)

(51) Int. Cl.
*H04W 24/10* (2009.01)
*H04L 27/26* (2006.01)
(Continued)

(52) U.S. Cl.
CPC .......... *H04W 24/10* (2013.01); *H04J 11/005* (2013.01); *H04L 27/26* (2013.01); *H04W 24/02* (2013.01);
(Continued)

(58) Field of Classification Search
CPC . H04L 27/26; H04L 27/2601; H04L 27/2602; H04W 16/10; H04W 24/02;
(Continued)

(56) References Cited

U.S. PATENT DOCUMENTS 8,886,250 B2 * 11/2014 Barbieri ................ H04W 24/10
370/252
9,008,675 B2 * 4/2015 Seo ........................ H04J 11/005
455/418

(Continued)

FOREIGN PATENT DOCUMENTS

KR 10-2009-0102419 A 9/2009
WO WO 2008/037536 A1 4/2008
(Continued)

OTHER PUBLICATIONS

Huawei et al., "Specification of Resource-Specific Measurements," 3GPP TSG RAN WG1 meeting #62bis, R1-105257, Xi'An, China, Oct. 11-15, 2010 (Oct. 5, 2010), 4 pages, XP050450438.

(Continued)

*Primary Examiner* — Tri H Phan
(74) *Attorney, Agent, or Firm* — Birch, Stewart, Kolasch & Birch, LLP

(57) ABSTRACT

A method of performing downlink measurement at a user equipment in a wireless communication system is described. Information indicating one or more subframes on which downlink measurement is to be performed is received from a base station. The downlink measurement is performed in the one or more subframes configured by the information. The one or more subframes are configured based on a subset of subframes with reduced activity of a neighbor base station which performs inter-cell interference coordination with the base station.

2 Claims, 11 Drawing Sheets

Related U.S. Application Data

(60) Provisional application No. 61/416,275, filed on Nov. 22, 2010, provisional application No. 61/417,203, filed on Nov. 24, 2010, provisional application No. 61/432,600, filed on Jan. 14, 2011, provisional application No. 61/434,811, filed on Jan. 20, 2011.

(51) Int. Cl.
  *H04W 74/00* (2009.01)
  *H04J 11/00* (2006.01)
  *H04W 24/02* (2009.01)
  *H04W 36/00* (2009.01)

(52) U.S. Cl.
  CPC ....... *H04W 74/004* (2013.01); *H04W 74/006* (2013.01); *H04W 36/0094* (2013.01)

(58) Field of Classification Search
  CPC . H04W 24/10; H04W 36/0094; H04W 36/20; H04W 72/00; H04W 72/004; H04W 72/006; H04W 72/04; H04W 72/042; H04W 72/0446; H04W 76/02; H04W 74/00; H04W 74/004; H04W 74/006; H04J 11/005
  See application file for complete search history.

(56) References Cited

U.S. PATENT DOCUMENTS

| | | | | |
|---|---|---|---|---|
| 9,036,483 | B2* | 5/2015 | Takahashi | H04W 72/1226 370/236 |
| 9,042,259 | B2* | 5/2015 | Jung | H04J 11/005 370/252 |
| 9,072,001 | B2* | 6/2015 | Jung | H04J 11/005 |
| 9,119,104 | B2* | 8/2015 | Takahashi | H04W 24/10 |
| 9,161,236 | B2* | 10/2015 | Seo | H04W 24/00 370/328 |
| 9,225,450 | B2* | 12/2015 | Seo | H04W 24/00 |
| 9,332,516 | B2* | 5/2016 | Blankenship | H04W 56/0015 |
| 2008/0057934 | A1 | 3/2008 | Sung et al. | |
| 2008/0080629 | A1 | 4/2008 | Munzner | |
| 2009/0264077 | A1 | 10/2009 | Damnjanovic | |
| 2011/0103367 | A1 | 5/2011 | Ishii | |
| 2012/0046028 | A1 | 2/2012 | Damnjanovic et al. | |
| 2013/0223267 | A1* | 8/2013 | Jung | H04J 11/005 370/252 |
| 2013/0223268 | A1* | 8/2013 | Jung | H04J 11/005 370/252 |
| 2013/0229938 | A1* | 9/2013 | Jung | H04J 11/005 370/252 |
| 2014/0016598 | A1* | 1/2014 | Kwon | H04L 5/0023 370/329 |
| 2014/0112254 | A1* | 4/2014 | Lindoff | H04W 74/002 370/328 |
| 2014/0213274 | A1* | 7/2014 | Weber | H04W 72/1231 455/452.1 |

FOREIGN PATENT DOCUMENTS

| | | |
|---|---|---|
| WO | WO 2009/113951 A1 | 9/2009 |
| WO | WO 2009/129413 A2 | 10/2009 |

OTHER PUBLICATIONS

Huawei et al., "The Possible Restrictions on the Configuration of Almost Blank Subframes in Macro-Pico Deployments," 3GPP TSG RAN WG1 meeting #62bis, R1-105150, Xi'An, China, Oct. 11-15, 2010 (Oct. 5, 2010), 5 pages, XP050450368.

LG Electronics, "Details of eICIC in Macro-Pico Case," 3GPP TSG RAN WG1 Meeting #62bis, R1-105352, Xian, China, Oct. 11-15, 2010 (Oct. 5, 2010), pp. 1-4, XP050450504.

* cited by examiner

FIG. 6
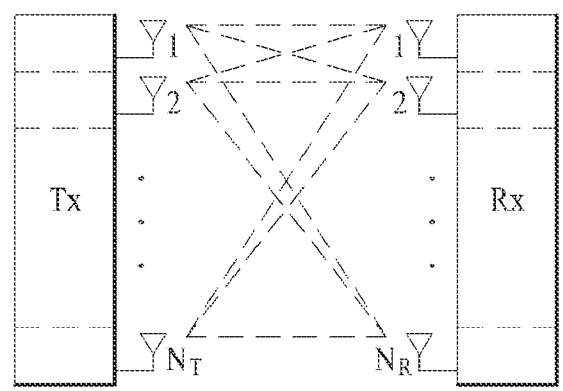
(a)
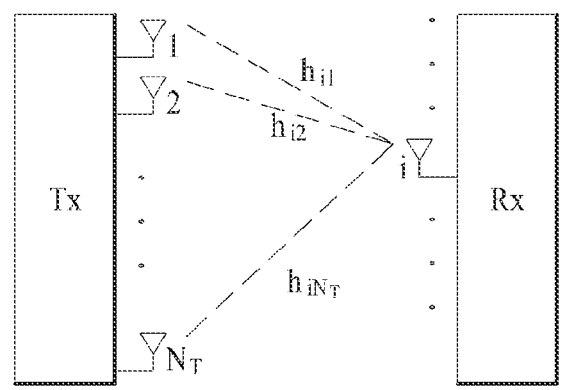
(b)

FIG. 7
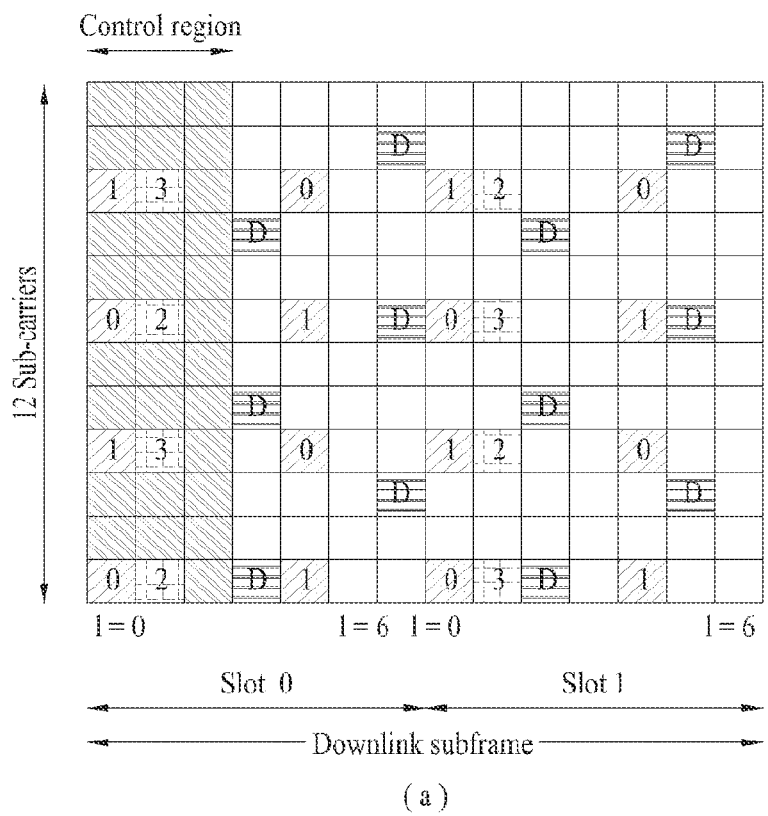
(a)
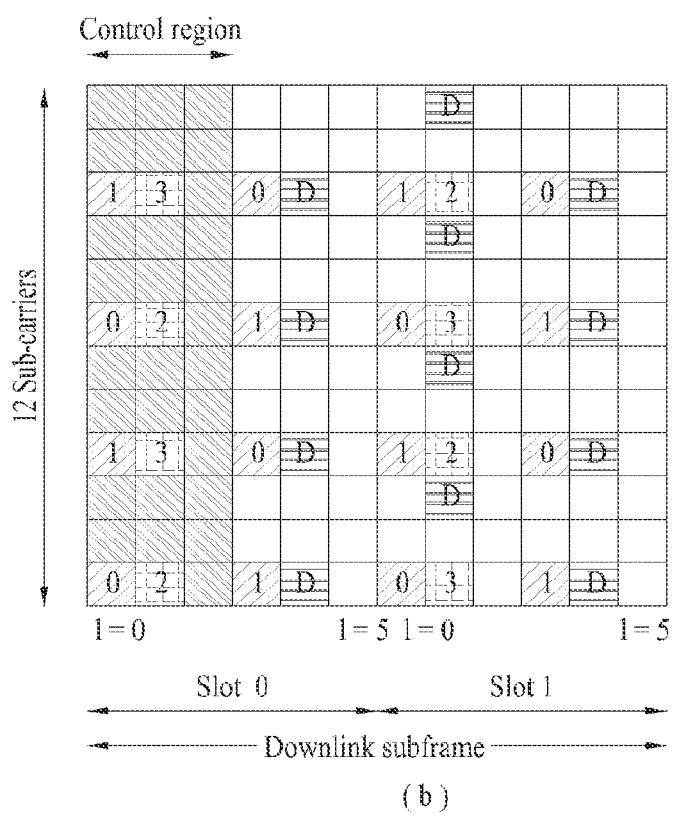
(b)

Silent subframe

METHOD AND DEVICE FOR MEASURING A DOWNLINK IN A WIRELESS COMMUNICATION SYSTEM

CROSS-REFERENCE TO RELATED APPLICATIONS

This application is a continuation of U.S. patent application Ser. No. 13/884,533 filed on May 9, 2013 (now U.S. Pat. No. 9,008,675 issued on Apr. 14, 2015), which is the National Phase of PCT/KR2011/008894 filed on Nov. 22, 2011, which claims priority under 35 U.S.C. §119(e) to U.S. Provisional Application Nos. 61/416,275 filed on Nov. 22, 2010, 61/417,203 filed on Nov. 24, 2010, 61/432,600 filed on Jan. 14, 2011, and 61/434,811 filed on Jan. 20, 2011, all of which are hereby expressly incorporated by reference into the presentation application.

BACKGROUND OF THE INVENTION

Technical Field

The present invention relates to a wireless communication system and, more particularly, to a downlink measurement method and apparatus in a wireless communication system.

Background Art

FIG. 1 is a diagram showing a heterogeneous-network wireless communication system 100 including a macro base station and a micro base station. In the present specification, the term heterogeneous network means a network in which the macro base station 110 and micro base stations 121 and 122 coexist although the same radio access technology (RAT) is used.

The macro base station 110 has wide coverage and high transmit power and means a general base station of a wireless communication system. The macro base station 110 may be referred to as a macro cell.

Each micro base station 121 or 122 may be referred to as a micro cell, a pico cell, a femto cell, a home eNB (HeNB), a relay, etc., for example. The micro base station 121 or 122 is a small version of the macro base station 110 and may independently operate while performing most functions of the macro base station. The micro base station may be an overlay type base station mounted in a region covered by the macro base station or may be a non-overlay type base station mounted in a shadow region which is not covered by the macro base station. The micro base station 121 or 122 may have narrower coverage and lower transmit power and accommodate fewer user equipments (UEs) as compared to the macro base station 110.

A UE 131 (hereinafter, referred to as a macro UE) may be directly served by the macro base station 110 and a UE 132 (hereinafter, referred to as a micro UE) may be served by the micro base station 122. In some cases, the UE 132 located in coverage of the micro base station 122 may be served by the macro base station 110.

The micro base station may be classified into two types depending on whether UE access is restricted. A first type is a closed subscriber group (CSG) micro base station and a second type is an open subscriber group (OSG) micro base station. The CSG micro base station may serve only authorized UEs and the OSG micro base station may serve all UEs.

SUMMARY OF THE INVENTION

If a UE served by a macro base station in the above-described heterogeneous network approaches a micro base station, interference may be generated in a downlink signal transmitted from the macro base station to the macro UE due to a strong downlink signal from the micro base station. Alternatively, a UE served by the micro base station may receive strong interference due to a downlink signal of the macro base station. If one cell receives strong interference from an adjacent cell, the adjacent cell may restrict a transmission thereof in some resource regions (e.g., some subframes) to perform inter-cell interference coordination (ICIC) for reducing/eliminating interference.

In order to accurately perform ICIC, it is necessary to accurately perform downlink measurement. This is because a determination as to in which resources transmit power of the adjacent cell is restricted or whether handover is performed may be made by accurately measuring inter-cell interference.

An object of the present invention devised to solve the problem lies in a method for accurately performing downlink measurement.

The technical problems solved by the present invention are not limited to the above technical problems and other technical problems which are not described herein will become apparent to those skilled in the art from the following description.

The object of the present invention can be achieved by providing a method of performing downlink measurement at a user equipment in a wireless communication system, including, at the user equipment, receiving a configuration of a resource set, on which downlink measurement is to be performed, from a base station, and performing downlink measurement on the configured resource set, wherein the configuration of the resource set, on which downlink measurement is to be performed, is determined by the base station based on a resource set, on which a neighboring cell performs inter-cell interference coordination.

In another aspect of the present invention, provided herein is a method of supporting downlink measurement of a user equipment at a base station in a wireless communication system, including transmitting a configuration of a resource set, on which the user equipment will perform downlink measurement, to the user equipment, and receiving a result of performing downlink measurement on the configured resource set, wherein the configuration of the resource set, on which downlink measurement is to be performed, is determined by the base station based on a resource set, on which a neighboring cell performs inter-cell interference coordination.

In another aspect of the present invention, provided herein is a user equipment for performing downlink measurement in a wireless communication system, including a reception module for receiving a downlink signal from a base station, a transmission module for transmitting an uplink signal to the base station, and a processor for controlling the user equipment including the reception module and the transmission module, wherein the processor is configured to enable to the user equipment to receive a configuration of a resource set, on which downlink measurement is to be performed, from the base station through the reception module and to perform downlink measurement on the configured resource set, and wherein the configuration of the resource set, on which downlink measurement is to be performed, is determined by the base station based on a resource set, on which a neighboring cell performs inter-cell interference coordination.

In another aspect of the present invention, provided herein is a base station for supporting downlink measurement of a user equipment in a wireless communication system, including a reception module for receiving an uplink signal from the user equipment, a transmission module for transmitting a downlink signal to the user equipment, and a processor for controlling the base station including the reception module and the transmission module, wherein the processor is configured to enable the base station to transmit a configuration of a resource set, on which the user equipment will perform downlink measurement, to the user equipment through the transmission module and to receive a result of performing downlink measurement on the configured resource set through the reception module, and wherein the configuration of the resource set, on which downlink measurement is to be performed, is determined by the base station based on a resource set, on which a neighboring cell performs inter-cell interference coordination.

The above-described embodiments of the present invention may include the following features.

The resource set, on which downlink measurement is to be performed, may a downlink subframe set.

The downlink subframe set may be configured based on subframes configured as almost blank subframes (ABSs) by the neighboring cell.

The downlink subframe set may be configured as a subset of subframes configured as non-almost blank subframes (ABSs) by the neighboring cell.

The subset may include subframes statically configured as ABSs by the neighboring cell.

The resource set, on which downlink measurement is to be performed, may be differently configured per cell to be subjected to downlink measurement, and downlink measurement may be performed according to the same calculation scheme regardless of the cell to be subjected to downlink measurement.

Downlink measurement may include measurement and calculation of reference signal received power (RSRP), reference signal received quality (RSRQ) and received signal strength indicator (RSSI), and the same calculation scheme is defined by $RSRQ=N*RSRP/RSSI$, where, N denotes the number of resource blocks within a frequency bandwidth of the resource set, on which downlink measurement is to be performed.

The resource set, on which downlink measurement is to be performed, may be equally configured regardless of a cell to be subjected to downlink measurement, and downlink measurement may be performed according to a calculation scheme which varies according to the cell to be subjected to downlink measurement.

Downlink measurement for a cell i may include measurement and calculation of reference signal received power (RSRP(i)) of the cell i, reference signal received quality (RSRQ(i)) of the cell i and received signal strength indicator (RSSI), and the calculation scheme of the cell i may be defined by $RSRQ(i)=N*RSRP(i)/(RSSI+N*c(i)*RSRP\_agressor)$, where, RSRP_agressor denotes RSRP of the neighboring cell, c(i) denotes a weight of RSRP_agressor, and N denotes the number of resource blocks within a frequency bandwidth of the resource set, on which downlink measurement is to be performed.

c(i) may have a value of a positive number, a negative number or 0.

It is to be understood that both the foregoing general description and the following detailed description of the present invention are exemplary and explanatory and are intended to provide further explanation of the invention as claimed.

According to the present invention, it is possible to provide a method for accurately performing downlink measurement.

The effects of the present invention are not limited to the above-described effects and other effects which are not described herein will become apparent to those skilled in the art from the following description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

FIG. 6, including (a) and (b), is a diagram showing the configuration of a wireless communication system having multiple antennas.

FIG. 7, including (a) and (b), is a diagram showing CRS and DRS patterns defined in the existing 3GPP LTE system.

DETAILED DESCRIPTION OF THE INVENTION

Figure 1:
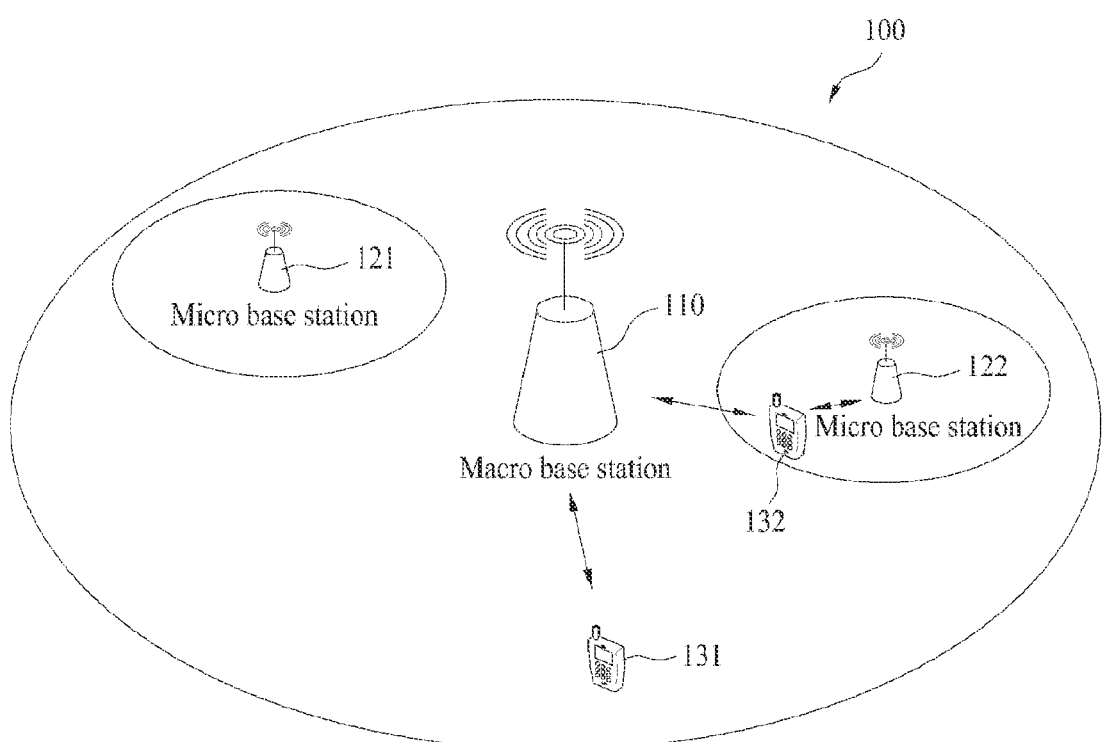
FIG. 1 is a diagram showing a heterogeneous-network wireless communication system 100 including a macro base station and a micro base station.

The following embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary.

The embodiments of the present invention are disclosed on the basis of a data communication relationship between a base station and a terminal. In this case, the base station is used as a terminal node of a network via which the base station can directly communicate with the terminal Specific operations to be conducted by the base station in the present invention may also be conducted by an upper node of the base station as necessary.

In other words, it will be obvious to those skilled in the art that various operations for enabling the base station to communicate with the terminal in a network composed of several network nodes including the base station will be conducted by the base station or other network nodes other than the base station. The term "Base Station (BS)" may be replaced with a fixed station, Node-B, eNode-B (eNB), or an access point as necessary. The term "relay" may be replaced with a Relay Node (RN) or a Relay Station (RS). The term "terminal" may also be replaced with a User Equipment (UE), a Mobile Station (MS), a Mobile Subscriber Station (MSS) or a Subscriber Station (SS) as necessary.

It should be noted that specific terms disclosed in the present invention are proposed for the convenience of description and better understanding of the present invention, and the use of these specific terms may be changed to another format within the technical scope or spirit of the present invention.

In some instances, well-known structures and devices are omitted in order to avoid obscuring the concepts of the present invention and the important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a 3rd Generation Project Partnership (3GPP) system, a 3GPP Long Term Evolution (LTE) system, and a 3GPP2 system. In particular, the steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. The CDMA may be embodied with radio technology such as UTRA (Universal Terrestrial Radio Access) or CDMA2000. The TDMA may be embodied with radio technology such as GSM (Global System for Mobile communications)/GPRS (General Packet Radio Service)/EDGE (Enhanced Data Rates for GSM Evolution). The OFDMA may be embodied with radio technology such as Institute of Electrical and Electronics Engineers (IEEE) 802.11 (Wi-Fi), IEEE 802.16 (WiMAX), IEEE 802-20, and E-UTRA (Evolved UTRA). The UTRA is a part of the UMTS (Universal Mobile Telecommunications System). The 3GPP (3rd Generation Partnership Project) LTE (long term evolution) is a part of the E-UMTS (Evolved UMTS), which uses E-UTRA. The 3GPP LTE employs the OFDMA in downlink and employs the SC-FDMA in uplink. The LTE-Advanced (LTE-A) is an evolved version of the 3GPP LTE. WiMAX can be explained by an IEEE 802.16e (WirelessMA-OFDMA Reference System) and an advanced IEEE 802.16m (WirelessMAN-OFDMA Advanced System). For clarity, the following description focuses on the 3GPP LTE and 3GPP LTE-A system. However, technical features of the present invention are not limited thereto.

The structure of a downlink radio frame will be described with reference to FIG. 2, including (a) and (b).

In a cellular Orthogonal Frequency Division Multiplexing (OFDM) radio packet communication system, uplink/downlink data packet transmission is performed in subframe units. One subframe is defined as a predetermined time interval including a plurality of OFDM symbols. The 3GPP LTE standard supports a type 1 radio frame structure applicable to Frequency Division Duplex (FDD) and a type 2 radio frame structure applicable to Time Division Duplex (TDD).

Figure 2:
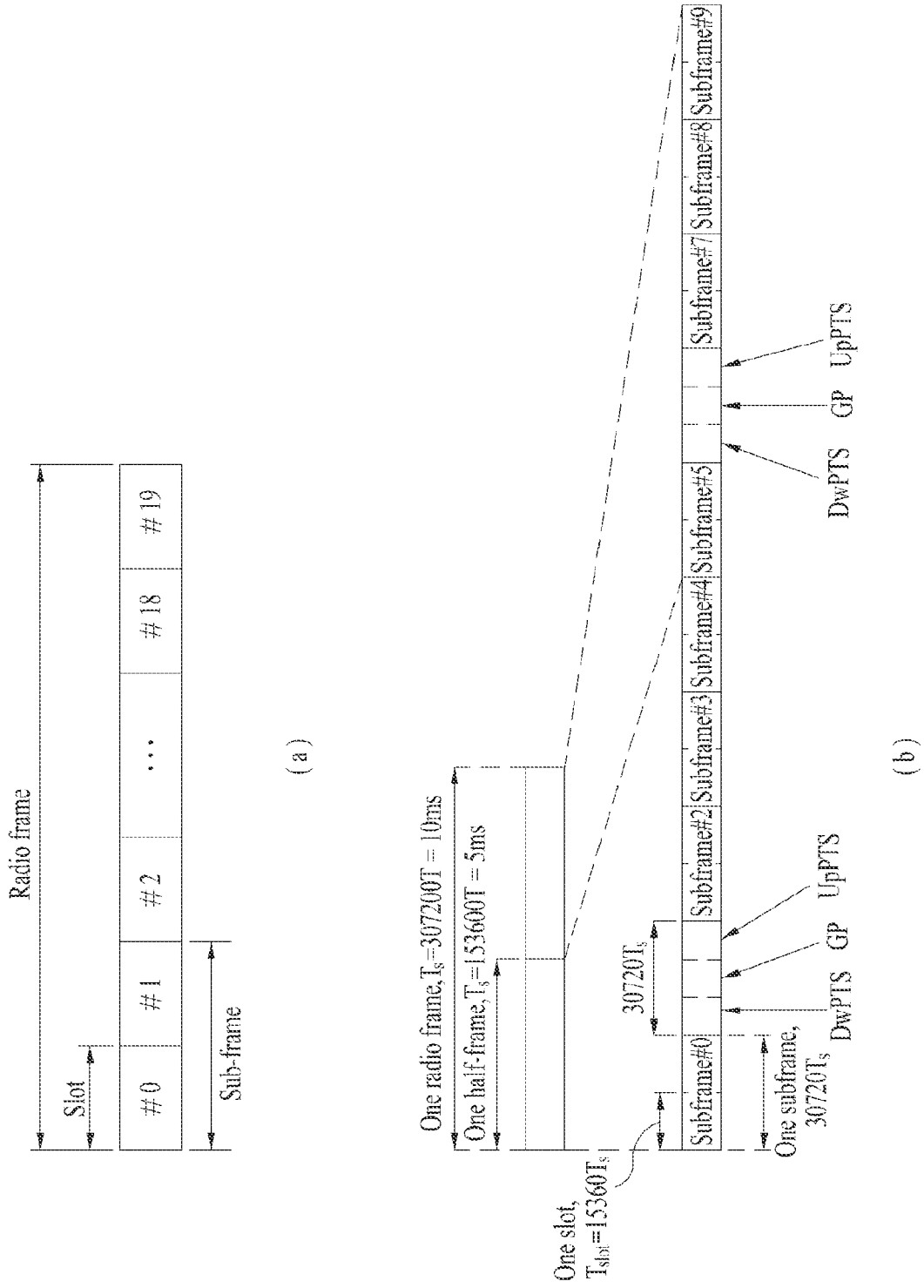
FIG. 2, including (a) and (b), is a diagram showing the structure of a downlink radio frame.

FIG. 2(*a*) is a diagram showing the structure of the type 1 radio frame. A downlink radio frame includes 10 subframes, and one subframe includes two slots in time domain. A time required for transmitting one subframe is defined in a Transmission Time Interval (TTI). For example, one subframe may have a length of 1 ms and one slot may have a length of 0.5 ms. One slot may include a plurality of OFDM symbols in time domain and include a plurality of Resource Blocks (RBs) in frequency domain. Since the 3GPP LTE system uses OFDMA in downlink, the OFDM symbol indicates one symbol duration. The OFDM symbol may be called a SC-FDMA symbol or a symbol duration. A RB is a resource allocation unit and includes a plurality of contiguous subcarriers in one slot.

The number of OFDM symbols included in one slot may be changed according to the configuration of a Cyclic Prefix (CP). The CP includes an extended CP and a normal CP. For example, if the OFDM symbols are configured by the normal CP, the number of OFDM symbols included in one slot may be seven. If the OFDM symbols are configured by the extended CP, the length of one OFDM symbol is increased, and thus the number of OFDM symbols included in one slot is less than that of the case of the normal CP. In case of the extended CP, for example, the number of OFDM symbols included in one slot may be six. If a channel state is instable, for example, if a User Equipment (UE) moves at a high speed, the extended CP may be used in order to further reduce interference between symbols.

In case of using the normal CP, since one slot includes seven OFDM symbols, one subframe includes 14 OFDM symbols. At this time, the first two or three OFDM symbols of each subframe may be allocated to a Physical Downlink Control Channel (PDCCH) and the remaining OFDM symbols may be allocated to a Physical Downlink Shared Channel (PDSCH).

FIG. 2(*b*) is a diagram showing the structure of the type 2 radio frame. The type 2 radio frame includes two half frames, each of which includes five subframes, a downlink pilot time slot (DwPTS), a guard period (GP), and an uplink pilot time slot (UpPTS). One of these subframes includes two slots. The DwPTS is used for initial cell search, synchronization and channel estimation at a user equipment. The UpPTS is used for channel estimation of a base station and uplink transmission synchronization of the user equipment. The guard period is to remove interference occurring in an uplink due to multi-path delay of a downlink signal between the uplink and a downlink. Meanwhile, one subframe includes two slots regardless of a type of the radio frame.

The structure of the radio frame is only exemplary. Accordingly, the number of subframes included in the radio frame, the number of slots included in the subframe or the number of symbols included in the slot may be changed in various manners.

Figure 3:
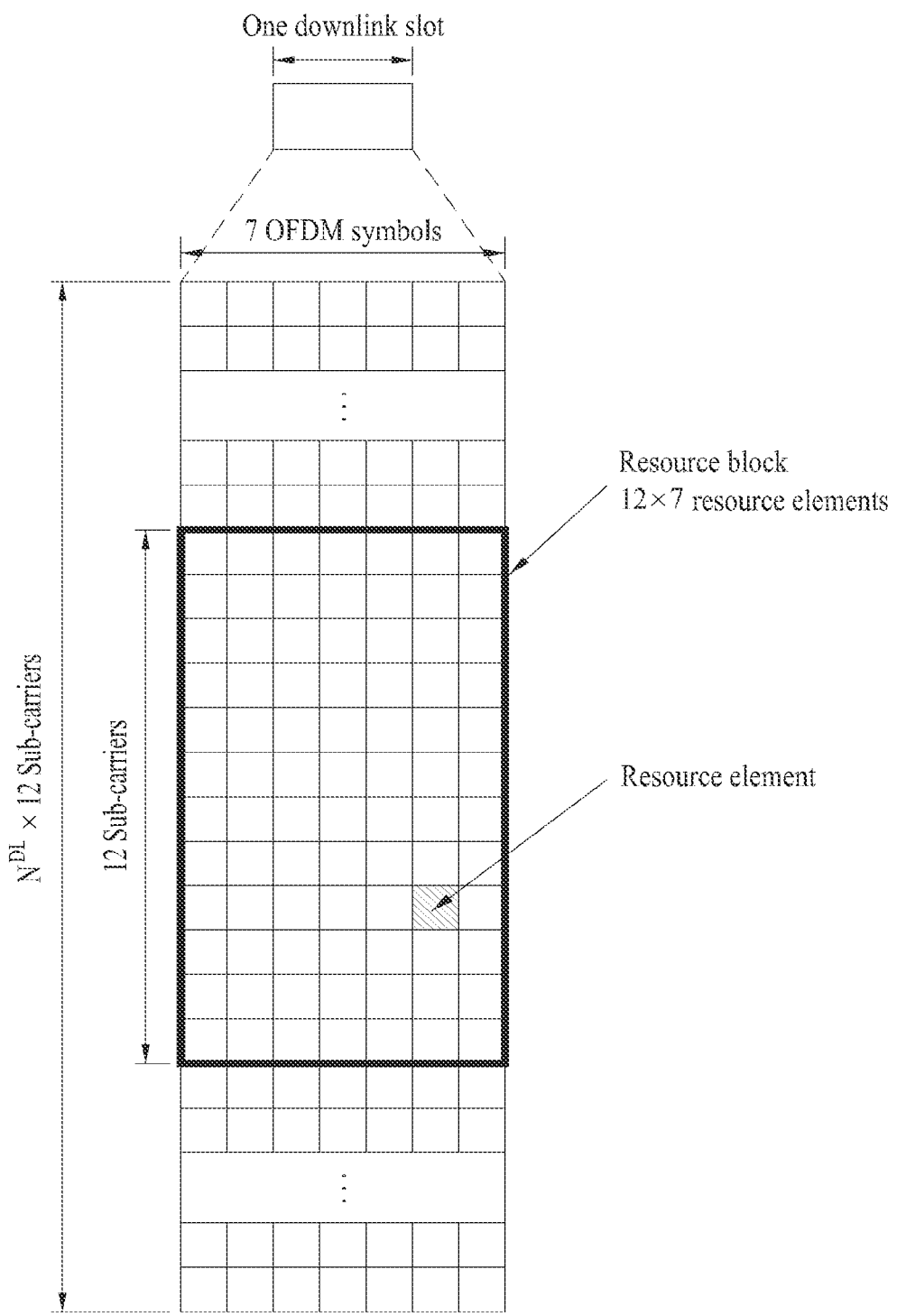
FIG. 3 is a diagram showing a resource grid of a downlink slot.

FIG. 3 is a diagram showing a resource grid in a downlink slot. Although one downlink slot includes seven OFDM symbols in a time domain and one RB includes 12 subcarriers in a frequency domain in the figure, the present invention is not limited thereto. For example, in case of a normal Cyclic Prefix (CP), one slot includes 7 OFDM symbols. However, in case of an extended CP, one slot includes 6 OFDM symbols. Each element on the resource grid is referred to as a resource element. One RB includes 12×7 resource elements. The number NDL of RBs included in the downlink slot is determined based on a downlink transmission bandwidth. The structure of the uplink slot may be equal to the structure of the downlink slot.

Figure 4:
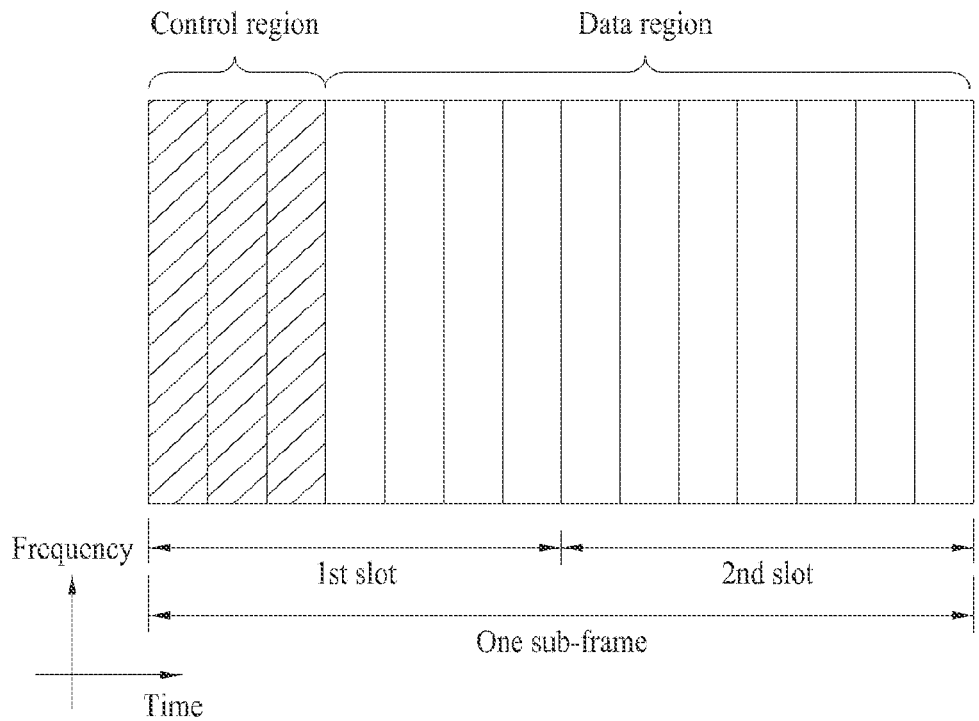
FIG. 4 is a diagram showing the structure of a downlink subframe.

FIG. 4 is a diagram showing the structure of a downlink subframe. A maximum of three OFDM symbols of a front portion of a first slot within one subframe corresponds to a control region to which a control channel is allocated. The remaining OFDM symbols correspond to a data region to which a Physical Downlink Shared Channel (PDSCH) is allocated. Examples of the downlink control channels used in the 3GPP LTE system include, for example, a Physical Control Format Indicator Channel (PCFICH), a Physical Downlink Control Channel (PDCCH), a Physical Hybrid automatic repeat request Indicator Channel (PHICH), etc. The PCFICH is transmitted at a first OFDM symbol of a subframe, and includes information about the number of OFDM symbols used to transmit the control channel in the subframe. The PHICH includes a HARQ ACK/NACK signal as a response of uplink transmission. The control information transmitted through the PDCCH is referred to as Downlink Control Information (DCI). The DCI includes uplink or downlink scheduling information or an uplink transmit power control command for a certain UE group. The PDCCH may include resource allocation and transmission format of a Downlink Shared Channel (DL-SCH), resource allocation information of an Uplink Shared Channel (UL-SCH), paging information of a Paging Channel (PCH), system information on the DL-SCH, resource allocation of an higher layer control message such as a Random Access Response (RAR) transmitted on the PDSCH, a set of transmit power control commands for an individual UEs in a certain UE group, transmit power control information, activation of Voice over IP (VoIP), etc. A plurality of PDCCHs may be transmitted within the control region. The UE may monitor the plurality of PDCCHs. The PDCCHs are transmitted on an aggregation of one or several consecutive control channel elements (CCEs). The CCE is a logical allocation unit used to provide the PDCCHs at a coding rate based on the state of a radio channel. The CCE corresponds to a plurality of resource element groups. The format of the PDCCH and the number of available bits are determined based on a correlation between the number of CCEs and the coding rate provided by the CCEs. The base station determines a PDCCH format according to a DCI to be transmitted to the UE, and attaches a Cyclic Redundancy Check (CRC) to control information. The CRC is masked with a Radio Network Temporary Identifier (RNTI) according to an owner or usage of the PDCCH. If the PDCCH is for a specific UE, a cell-RNTI (C-RNTI) of the UE may be masked to the CRC. Alternatively, if the PDCCH is for a paging message, a paging indicator identifier (P-RNTI) may be masked to the CRC. If the PDCCH is for system information (more specifically, a system information block (SIB)), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

Figure 5:
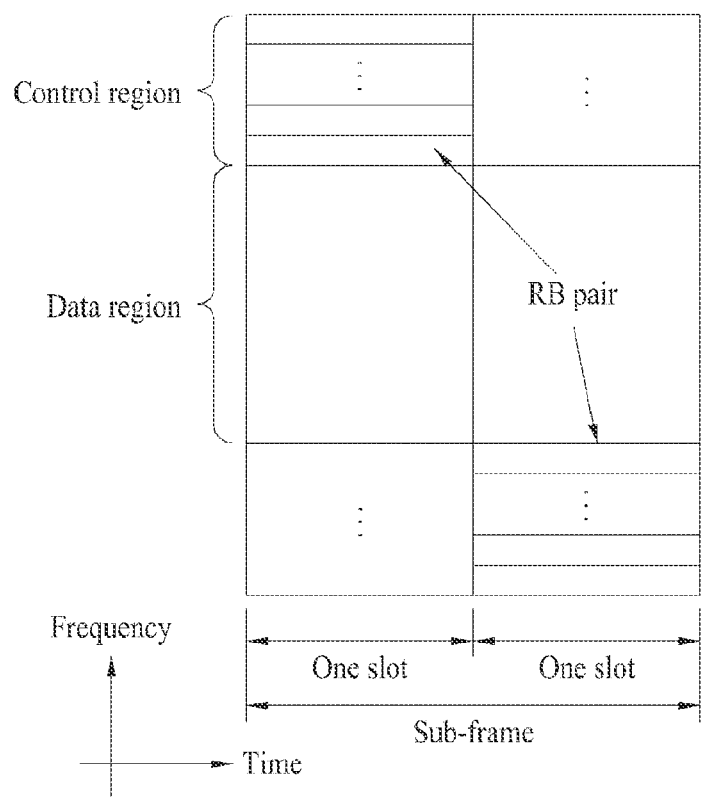
FIG. 5 is a diagram showing the structure of an uplink subframe.

FIG. 5 is a diagram showing the structure of an uplink frame. The uplink subframe may be divided into a control region and a data region in a frequency domain. A Physical Uplink Control Channel (PUCCH) including uplink control information is allocated to the control region. A Physical Uplink Shared Channel (PUSCH) including user data is allocated to the data region. In order to maintain single carrier property, one UE does not simultaneously transmit the PUCCH and the PUSCH. The PUCCH for one UE is allocated to a RB pair in a subframe. RBs belonging to the RB pair occupy different subcarriers with respect to two slots. Thus, the RB pair allocated to the PUCCH is "frequency-hopped" at a slot boundary.

Modeling of Multi-Input Multi-Output (MIMO) System

FIG. 6, including (a) and (b), is a diagram showing the configuration of a wireless communication system having multiple antennas.

As shown in FIG. 6(a), if the number of transmission antennas is increased to NT and the number of reception antennas is increased to NR, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate R0 upon using a single antenna and a rate increase ratio Ri.

$$Ri = \min(NT, NR) \quad \text{Equation 1}$$

For example, in an MIMO system using four transmission antennas and four reception antennas, it is possible to theoretically acquire a transfer rate which is four times that of a single antenna system. After the increase in the theoretical capacity of the MIMO system was proved in the mid-1990s, various technologies of substantially improving a data transfer rate have been actively developed up to now. In addition, several technologies are already applied to the various radio communication standards such as the third-generation mobile communication and the next-generation wireless local area network (LAN).

According to the researches into the MIMO antenna up to now, various researches such as researches into information theory related to the calculation of the communication capacity of a MIMO antenna in various channel environments and multiple access environments, researches into the model and the measurement of the radio channels of the MIMO system, and researches into space-time signal processing technologies of improving transmission reliability and transmission rate have been actively conducted.

The communication method of the MIMO system will be described in more detail using mathematical modeling. In the above system, it is assumed that NT transmission antennas and NR reception antennas are present.

In transmitted signals, if the NT transmission antennas are present, the number of pieces of maximally transmittable information is NT. The transmitted information may be expressed as follows.

$$s=[s_1,s_2,\ldots,s_{N_T}]^T \qquad \text{Equation 2}$$

The transmitted information $s_1, s_2, \ldots, s_{N_T}$ may have different transmit powers. If the respective transmit powers are $P_1, P_2, \ldots, P_{N_T}$, the transmitted information with adjusted powers may be expressed as follows.

$$\hat{s}=[\hat{s}_1,\hat{s}_2,\ldots,\hat{s}_{N_T}]^T=[P_1s_1,P_2s_2,\ldots,P_{N_T}s_{N_T}]^T \qquad \text{Equation 3}$$

In addition, ŝ may be expressed using a diagonal matrix P of the transmit powers as follows.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{Equation 4}$$

Consider that the NT actually transmitted signals $x_1, x_2, \ldots, x_{N_T}$ are configured by applying a weight matrix W to the information vector ŝ with the adjusted transmit powers. The weight matrix W serves to appropriately distribute the transmitted information to each antenna according to a transport channel state, etc. $s_1, s_2, \ldots, s_{N_T}$ may be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \vdots \\ w_{i1} & w_{i2} & \ldots & w_{iN_T} \\ \vdots & & & \ddots \\ w_{N_T1} & w_{N_T2} & \ldots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \qquad \text{Equation 5}$$

where, $\omega_{ij}$ denotes a weight between an i-th transmission antenna and j-th information. W is also called a precoding matrix.

In received signals, if the NR reception antennas are present, respective received signals $y_1, y_2, \ldots, y_{N_R}$ of the antennas are expressed as follows.

$$y=[y_1,y_2,\ldots,y_{N_R}]^T \qquad \text{Equation 6}$$

If channels are modeled in the MIMO wireless communication system, the channels may be distinguished according to transmission/reception antenna indexes. A channel from the transmission antenna j to the reception antenna i is denoted by hij. In hij, it is noted that the indexes of the reception antennas precede the indexes of the transmission antennas in view of the order of indexes.

FIG. 6(b) is a diagram showing channels from the NT transmission antennas to the reception antenna i. The channels may be combined and expressed in the form of a vector and a matrix. In FIG. 6(b), the channels from the NT transmission antennas to the reception antenna i may be expressed as follows.

$$h_i^T=[h_{i1},h_{i2},\ldots,h_{iN_T}] \qquad \text{Equation 7}$$

Accordingly, all the channels from the NT transmission antennas to the NR reception antennas may be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & & \ddots \\ h_{N_R1} & h_{N_R2} & \ldots & h_{N_RN_T} \end{bmatrix} \qquad \text{Equation 8}$$

An Additive White Gaussian Noise (AWGN) is added to the actual channels after a channel matrix H. The AWGN $n_1, n_2, \ldots, n_{N_R}$ added to the NT transmission antennas may be expressed as follows.

$$n=[n_1,n_2,\ldots,n_{N_R}]^T \qquad \text{Equation 9}$$

Through the above-described mathematical modeling, the received signals may be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & & \ddots \\ h_{N_R1} & h_{N_R2} & \ldots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \qquad \text{Equation 10}$$

$$Hx + n$$

The number of rows and columns of the channel matrix H indicating the channel state is determined by the number of transmission and reception antennas. The number of rows of the channel matrix H is equal to the number NR of reception antennas and the number of columns thereof is equal to the number NT of transmission antennas. That is, the channel matrix H is an NR×NT matrix.

The rank of the matrix is defined by the smaller of the number of rows or columns, which is independent from each other. Accordingly, the rank of the matrix is not greater than the number of rows or columns. The rank rank(H) of the channel matrix H is restricted as follows.

$$\text{rank}(H) \leq \min(N_T, N_R) \qquad \text{Equation 11}$$

When the matrix is subjected to Eigen value decomposition, the rank may be defined by the number of Eigen values excluding 0. Similarly, when the matrix is subjected to singular value decomposition, the rank may be defined by the number of singular values excluding 0. Accordingly, the physical meaning of the rank in the channel matrix may be a maximum number of different transmittable information in a given channel.

Reference Signal (RS)

In a wireless communication system, since packets are transmitted through a radio channel, a signal may be distorted during transmission. In order to enable a reception side to correctly receive the distorted signal, distortion of the received signal should be corrected using channel information. In order to detect the channel information, a method of transmitting a signal, of which both the transmission side and the reception side are aware, and detecting channel information using a distortion degree when the signal is received through a channel is mainly used. The above signal is referred to as a pilot signal or a reference signal (RS).

When transmitting and receiving data using multiple antennas, the channel states between the transmission antennas and the reception antennas should be detected in order to correctly receive the signal. Accordingly, each transmission antenna has an individual RS.

A downlink RS includes a Common RS (CRS) shared among all UEs in a cell and a Dedicated RS (DRS) for only a specific UE. It is possible to provide information for channel estimation and demodulation using such RSs.

The reception side (UE) estimates the channel state from the CRS and feeds an indicator associated with channel quality, such as a Channel Quality Indicator (CQI), a Precoding Matrix Index (PMI) and/or a Rank Indicator (RI), back to the transmission side (eNodeB). The CRS may be also called a cell-specific RS. Alternatively, an RS associated with the feedback of Channel State Information (CSI) such as CQI/PMI/RI may be separately defined as a CSI-RS.

The DRS may be transmitted through REs if data demodulation on a PDSCH is necessary. The UE may receive the presence/absence of the DRS from a higher layer and receive information indicating that the DRS is valid only when the PDSCH is mapped. The DRS may be also called a UE-specific RS or a Demodulation RS (DRS).

FIG. 7, including (a) and (b), is a diagram showing a pattern of CRSs and DRSs mapped on a downlink RB pair defined in the existing 3GPP LTE system (e.g., Release-8). The downlink RB as a mapping unit of the RSs may be expressed in units of one subframe on a time domain×12 subcarriers on a frequency domain. That is, on the time axis, one RB has a length of 14 OFDM symbols in case of the normal CP (FIG. 7(a)) and has a length of 12 OFDM symbols in case of the extended CP (FIG. 7(b)).

FIG. 7 shows the locations of the RSs on the RB pair in the system in which the eNodeB supports four transmission antennas. In FIG. 7, Resource Elements (REs) denoted by "0", "1", "2" and "3" indicate the locations of the CRSs of the antenna port indexes 0, 1, 2 and 3, respectively. In FIG. 7, the RE denoted by "D" indicates the location of the DRS.

Hereinafter, the CRS will be described in detail.

The CRS is used to estimate the channel of a physical antenna and is distributed over the entire band as an RS which is able to be commonly received by all UEs located within a cell. The CRS may be used for CSI acquisition and data demodulation.

The CRS is defined in various formats according to the antenna configuration of the transmission side (eNodeB). The 3GPP LTE (e.g., Release-8) system supports various antenna configurations, and a downlink signal transmission side (eNodeB) has three antenna configurations such as a single antenna, two transmission antennas and four transmission antennas. If the eNodeB performs single-antenna transmission, RSs for a single antenna port are arranged. If the eNodeB performs two-antenna transmission, RSs for two antenna ports are arranged using a Time Division Multiplexing (TDM) and/or Frequency Division Multiplexing (FDM) scheme. That is, the RSs for the two antenna ports are arranged in different time resources and/or different frequency resources so as to be distinguished from each other. In addition, if the eNodeB performs four-antenna transmission, RSs for four antenna ports are arranged using the TDM/FDM scheme. The channel information estimated by the downlink signal reception side (UE) through the CRSs may be used to demodulate data transmitted using a transmission scheme such as single antenna transmission, transmit diversity, closed-loop spatial multiplexing, open-loop spatial multiplexing, or Multi-User MIMO (MU-MIMO).

If multiple antennas are supported, when RSs are transmitted from a certain antenna port, the RSs are transmitted at the locations of the REs specified according to the RS pattern and any signal is not transmitted at the locations of the REs specified for another antenna port.

The rule of mapping the CRSs to the RBs is defined by Equation 12.

$$k = 6m + (v + v_{shift}) \bmod 6$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

Equation 12

In Equation 12, k denotes a subcarrider index, l denotes a symbol index, and p denotes an antenna port index. $N_{symb}^{DL}$ denotes the number of OFDM symbols of one downlink slot, $N_{RB}^{DL}$ denotes the number of RBs allocated to the downlink, ns denotes a slot index, and $N_{ID}^{cell}$ denotes a cell ID. mod indicates a modulo operation. The location of the RS in the frequency domain depends on a value Vshift. Since the value Vshift depends on the cell ID, the location of the RS has a frequency shift value which varies according to the cell.

More specifically, in order to increase channel estimation performance through the CRSs, the locations of the CRSs in the frequency domain may be shifted so as to be changed according to the cells. For example, if the RSs are located at an interval of three subcarriers, the RSs are arranged on 3k-th subcarriers in one cell and arranged on (3k+1)-th subcarriers in the other cell. In view of one antenna port, the RSs are arranged at an interval of 6 REs (that is, interval of 6 subcarriers) in the frequency domain and are separated from REs, on which RSs allocated to another antenna port are arranged, by 3 REs in the frequency domain.

In addition, power boosting is applied to the CRSs. The power boosting indicates that the RSs are transmitted using higher power by bringing the powers of the REs except for the REs allocated for the RSs among the REs of one OFDM symbol.

In the time domain, the RSs are arranged from a symbol index (l=0) of each slot as a starting point at a constant interval. The time interval is differently defined according to the CP length. The RSs are located on symbol indexes 0 and 4 of the slot in case of the normal CP and are located on symbol indexes 0 and 3 of the slot in case of the extended CP. Only RSs for a maximum of two antenna ports are defined in one OFDM symbol. Accordingly, upon four-transmission antenna transmission, the RSs for the antenna ports 0 and 1 are located on the symbol indexes 0 and 4 (the symbol indexes 0 and 3 in case of the extended CP) of the slot and the RSs for the antenna ports 2 and 3 are located on the symbol index 1 of the slot. The frequency locations of the RSs for the antenna ports 2 and 3 in the frequency domain are exchanged with each other in a second slot.

In order to support spectrum efficiency higher than that of the existing 3GPP LTE (e.g., Release-8) system, a system (e.g., an LTE-A system) having the extended antenna configuration may be designed. The extended antenna configuration may have, for example, eight transmission antennas. In the system having the extended antenna configuration, UEs which operate in the existing antenna configuration needs to be supported, that is, backward compatibility needs to be supported. Accordingly, it is necessary to support a RS pattern according to the existing antenna configuration and to design a new RS pattern for an additional antenna configuration. If CRSs for the new antenna ports are added to the system having the existing antenna configuration, RS overhead is rapidly increased and thus data transfer rate is reduced. In consideration of these problems, in an LTE-A (Advanced) system which is an evolution version of the 3GPP LTE system, separate RSs (CSI-RSs) for measuring the CSI for the new antenna ports may be used.

Hereinafter, the DRS will be described in detail.

The DRS (or UE-specific RS) is used to demodulate data. A precoding weight used for a specific UE upon multi-antenna transmission is also used in an RS without change so as to estimate an equivalent channel, in which a transfer channel and the precoding weight transmitted from each transmission antenna are combined, when the UE receives the RSs.

The existing 3GPP LTE system (e.g., Release-8) supports four-transmission antenna transmission as a maximum and the DRS for Rank 1 beamforming is defined. The DRS for Rank 1 beamforming is also denoted by the RS for the antenna port index 5. The rule of the DRS mapped on the RBs is defined by Equations 13 and 14. Equation 13 is for the normal CP and Equation 14 is for the extended CP.

$$k = (k') \bmod N_{sc}^{RB} + N_{sc}^{RB} \cdot n_{PRB} \qquad \text{Equation 13}$$

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

$$v_{shift} = N_{ID}^{cell} \bmod 3$$

$$k = (k') \bmod N_{sc}^{RB} + N_{sc}^{RB} \cdot n_{PRB} \qquad \text{Equation 14}$$

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 1, 2 & \text{if } n_s \bmod 2 = 1 \end{cases}$$

$$m' = 0, 1, \ldots, 4N_{RB}^{PDSCH} - 1$$

$$v_{shift} = N_{ID}^{cell} \bmod 3$$

In Equations 13 and 14, k denotes a subcarrier index, l denotes a symbol index, and p denotes an antenna port. $N_{SC}^{RB}$ denotes the resource block size in the frequency domain and is expressed by the number of subcarriers. $n_{PRB}$ denotes a physical resource block number. $N_{RB}^{PDSCH}$ denotes the bandwidth of the RB of the PDSCH transmission. $n_s$ denotes a slot index, and $N_{ID}^{cell}$ denotes a cell ID. mod indicates a modulo operation. The location of the RS in the frequency domain depends on a value Vshift. Since the value Vshift depends on the cell ID, the location of the RS has a frequency shift value which varies according to the cell.

In the LTE-A system which is the evolution version of the 3GPP LTE system, high-order MIMO, multi-cell transmission, evolved MU-MIMO or the like is considered. In order to support efficient RS management and a developed transmission scheme, DRS-based data demodulation is considered. That is, separately from the DRS (antenna port index 5) for Rank 1 beamforming defined in the existing 3GPP LTE (e.g., Release-8) system, DRSs for two or more layers may be defined in order to support data transmission through the added antenna.

Cooperative Multi-Point (CoMP)

According to the improved system performance requirements of the 3GPP LTE-A system, CoMP transmission/reception technology (may be referred to as co-MIMO, collaborative MIMO or network MIMO) is proposed. The CoMP technology can increase the performance of the UE located on a cell edge and increase average sector throughput.

In general, in a multi-cell environment in which a frequency reuse factor is 1, the performance of the UE located on the cell edge and average sector throughput may be reduced due to Inter-Cell Interference (ICI). In order to reduce the ICI, in the existing LTE system, a method of enabling the UE located on the cell edge to have appropriate throughput and performance using a simple passive method such as Fractional Frequency Reuse (FFR) through the UE-specific power control in the environment restricted by interference is applied. However, rather than decreasing the use of frequency resources per cell, it is preferable that the ICI is reduced or the UE reuses the ICI as a desired signal. In order to accomplish the above object, a CoMP transmission scheme may be applied.

The CoMP scheme applicable to the downlink may be largely classified into a Joint Processing (JP) scheme and a Coordinated Scheduling/Beamforming (CS/CB) scheme.

In the JP scheme, each point (eNodeB) of a CoMP unit may use data. The CoMP unit refers to a set of eNodeBs used in the CoMP scheme. The JP scheme may be classified into a joint transmission scheme and a dynamic cell selection scheme.

The joint transmission scheme refers to a scheme for transmitting a PDSCH from a plurality of points (a part or the whole of the CoMP unit). That is, data transmitted to a single UE may be simultaneously transmitted from a plurality of transmission points. According to the joint transmission scheme, it is possible to coherently or non-coherently improve the quality of the received signals and to actively eliminate interference with another UE.

The dynamic cell selection scheme refers to a scheme for transmitting a PDSCH from one point (of the CoMP unit). That is, data transmitted to a single UE at a specific time is transmitted from one point and the other points in the cooperative unit at that time do not transmit data to the UE. The point for transmitting the data to the UE may be dynamically selected.

According to the CS/CB scheme, the CoMP units may cooperatively perform beamforming of data transmission to a single UE. Although only a serving cell transmits the data, user scheduling/beamforming may be determined by the coordination of the cells of the CoMP unit.

In uplink, coordinated multi-point reception refers to reception of a signal transmitted by coordination of a plurality of geographically separated points. The CoMP scheme applicable to the uplink may be classified into Joint Reception (JR) and Coordinated Scheduling/Beamforming (CS/CB).

The JR scheme indicates that a plurality of reception points receives a signal transmitted through a PUSCH, the CS/CB scheme indicates that only one point receives a PUSCH, and user scheduling/beamforming is determined by the coordination of the cells of the CoMP unit.

Sounding RS (SRS)

An SRS is used for enabling an eNodeB to measure channel quality so as to perform frequency-selective scheduling on the uplink and is not associated with uplink data and/or control information transmission. However, the present invention is not limited thereto and the SRS may be used for improved power control or supporting of various start-up functions of UEs which are not recently scheduled. Examples of the start-up functions may include, for example, initial Modulation and Coding Scheme (MCS), initial power control for data transmission, timing advance, and frequency-semi-selective scheduling (scheduling for selectively allocating frequency resources in a first slot of a subframe and pseudo-randomly hopping to another frequency in a second slot).

In addition, the SRS may be used for downlink channel quality measurement on the assumption that the radio channel is reciprocal between the uplink and downlink. This assumption is particularly valid in a Time Division Duplex (TDD) system in which the same frequency band is shared between the uplink and the downlink and is divided in the time domain.

The subframe through which the SRS is transmitted by a certain UE within the cell is indicated by cell-specific broadcast signaling. 4-bit cell-specific "SrsSubframeConfiguration" parameter indicates 15 possible configurations of the subframe through which the SRS can be transmitted within each radio frame. By such configurations, it is possible to provide adjustment flexibility of SRS overhead according to a network arrangement scenario. The remaining one (sixteenth) configuration of the parameters indicates the switch-off of the SRS transmission within the cell and is suitable for a serving cell for serving high-rate UEs.

Figure 8:
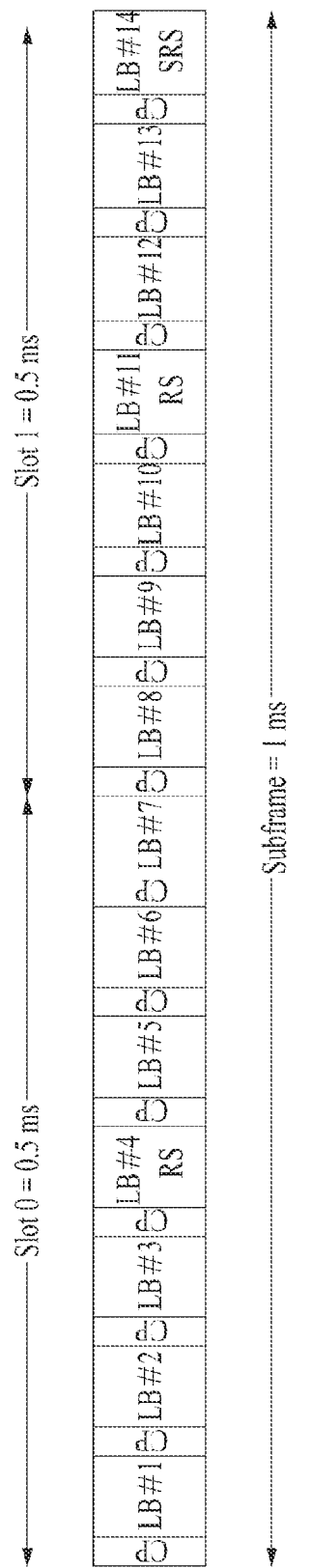
FIG. 8 is a diagram showing an uplink subframe structure including an SRS symbol.

As shown in FIG. 8, the SRS is always transmitted on a last SC-FDMA symbol of the configured subframe. Accordingly, the SRS and a Demodulation RS (DMRS) are located on different SC-FDMA symbols. PUSCH data transmission is not allowed on the SC-FDMA symbol specified for SRS transmission and thus sounding overhead does not approximately exceed 7% even when the sounding overhead is highest (that is, even when SRS transmission symbols are present in all subframes).

Each SRS symbol is generated by the basic sequence (random sequence or Zadoff-Ch (ZC)-based sequence set) with respect to a given time unit and frequency band, and all UEs within the cell use the same basic sequence. At this time, the SRS transmission of the plurality of UEs within the cell in the same time unit and the same frequency band is orthogonally distinguished by different cyclic shifts of the base sequence allocated to the plurality of UEs. The SRS sequences of different cells can be distinguished by allocating different basic sequences to respective cells, but the orthogonality between the different basic sequences is not guaranteed.

Relay Node (RN)

A RN may be considered for, for example, enlargement of high data rate coverage, improvement of group mobility, temporary network deployment, improvement of cell edge throughput and/or provision of network coverage to a new area.

A RN forwards data transmitted or received between the eNodeB and the UE, two different links (backhaul link and access link) are applied to the respective carrier frequency bands having different attributes. The eNodeB may include a donor cell. The RN is wirelessly connected to a radio access network through the donor cell.

The backhaul link between the eNodeB and the RN may be represented by a backhaul downlink if downlink frequency bands or downlink subframe resources are used, and may be represented by a backhaul uplink if uplink frequency bands or uplink subframe resources are used. Here, the frequency band is resource allocated in a Frequency Division Duplex (FDD) mode and the subframe is resource allocated in a Time Division Duplex (TDD) mode. Similarly, the access link between the RN and the UE(s) may be represented by an access downlink if downlink frequency bands or downlink subframe resources are used, and may be represented by an access uplink if uplink frequency bands or uplink subframe resources are used.

The eNodeB must have functions such as uplink reception and downlink transmission and the UE must have functions such as uplink transmission and downlink reception. The RN must have all functions such as backhaul uplink transmission to the eNodeB, access uplink reception from the UE, the backhaul downlink reception from the eNodeB and access downlink transmission to the UE.

Figure 9:
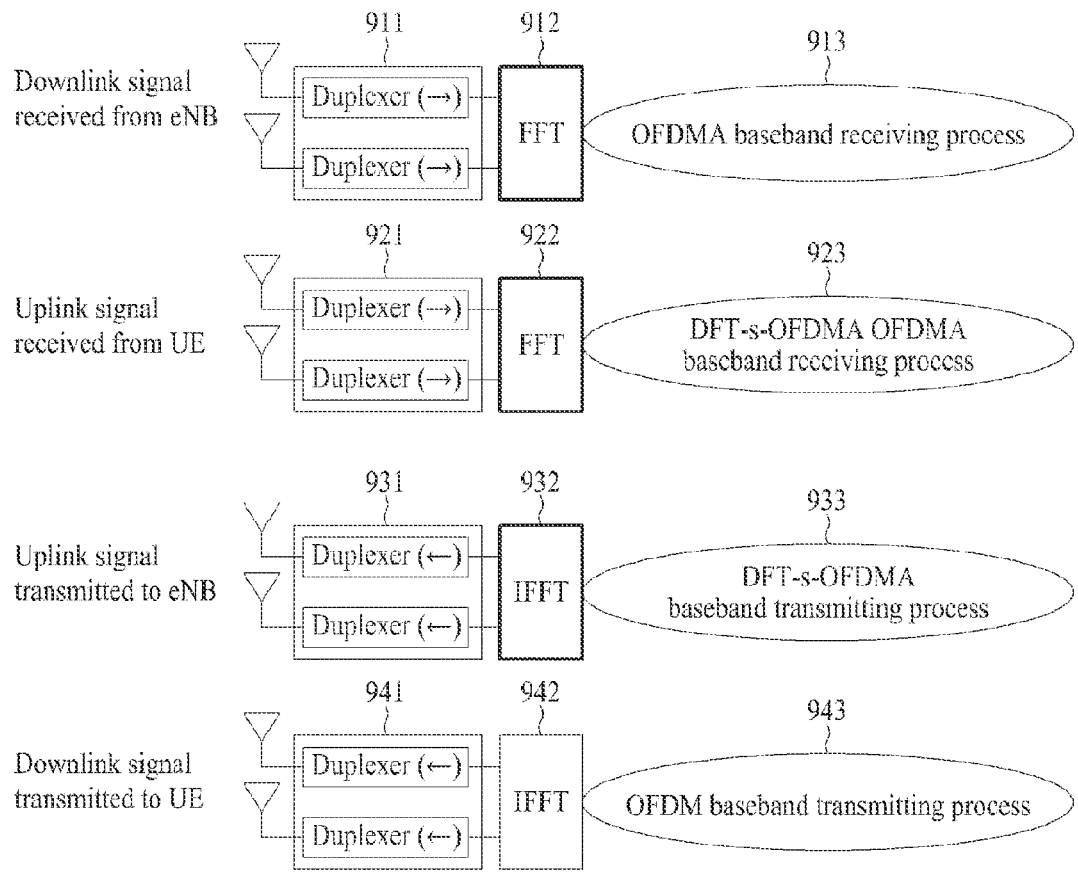
FIG. 9 is a diagram showing an example of implementing a transmission and reception function of an FDD mode relay.

FIG. 9 is a diagram showing an example of implementing transmission and reception functions of a FDD-mode RN. The reception function of the RN will now be conceptually described. A downlink signal received from the eNodeB is forwarded to a Fast Fourier Transform (FFT) module 912 through a duplexer 911 and is subjected to an OFDMA baseband reception process 913. An uplink signal received from the UE is forwarded to a FFT module 922 through a duplexer 921 and is subjected to a Discrete Fourier Transform-spread-OFDMA (DFT-s-OFDMA) baseband reception process 923. The process of receiving the downlink signal from the eNodeB and the process of receiving the uplink signal from the UE may be simultaneously performed. The transmission function of the RN will now be described. The uplink signal transmitted to the eNodeB is transmitted through a DFT-s-OFDMA baseband transmission process 933, an Inverse FFT (IFFT) module 932 and a duplexer 931. The downlink signal transmitted to the UE is transmitted through an OFDM baseband transmission process 943, an IFFT module 942 and a duplexer 941. The process of transmitting the uplink signal to the eNodeB and the process of transmitting the downlink signal to the UE may be simultaneously performed. In addition, the duplexers shown as functioning in one direction may be implemented by one bidirectional duplexer. For example, the duplexer 911 and the duplexer 931 may be implemented by one bidirectional duplexer and the duplexer 921 and the duplexer 941 may be implemented by one bidirectional duplexer. The bidirectional duplexer may branch into the IFFT module associated with the transmission and reception on a specific carrier frequency band and the baseband process module line.

In association with the use of the band (or the spectrum) of the RN, the case where the backhaul link operates in the same frequency band as the access link is referred to as "in-band" and the case where the backhaul link and the access link operate in different frequency bands is referred to as "out-band". In both the in-band case and the out-band case, a UE which operates according to the existing LTE system (e.g., Release-8), hereinafter, referred to as a legacy UE, must be able to be connected to the donor cell.

The RN may be classified into a transparent RN or a non-transparent RN depending on whether or not the UE recognizes the RN. The term "transparent" indicates that the UE cannot recognize whether communication with the network is performed through the RN and the term "non-transparent" indicates that the UE recognizes whether communication with the network is performed through the RN.

In association with the control of the RN, the RN may be classified into a RN configured as a part of the donor cell or a RN for controlling the cell.

The RN configured as the part of the donor cell may have a RN ID, but does not have its cell identity. When at least a part of Radio Resource Management (RRM) of the RN is controlled by the eNodeB to which the donor cell belongs (even when the remaining parts of the RRM are located on the RN), the RN is configured as the part of the donor cell. Preferably, such an RN can support a legacy UE. For example, examples of such an RN include various types of relays such as smart repeaters, decode-and-forward relays, L2 (second layer) relays and Type-2 relays.

In the RN for controlling the cell, the RN controls one or several cells, unique physical layer cell identities are provided to the cells controlled by the RN, and the same RRM mechanism may be used. From the viewpoint of the UE, there is no difference between access to the cell controlled by the RN and access to the cell controlled by a general eNodeB. Preferably, the cell controlled by such an RN may support a legacy UE. For example, examples of such an RN include self-backhauling relays, L3 (third layer) relays, Type-1 relays and Type-1a relays.

The Type-1 relay is an in-band relay for controlling a plurality of cells, which appears to be different from the donor cell, from the viewpoint of the UE. In addition, the plurality of cells has respective physical cell IDs (defined in the LTE Release-8) and the RN may transmit its synchronization channel, RSs, etc. In a single-cell operation, the UE may directly receive scheduling information and HARQ feedback from the RN and transmit its control channel (Scheduling Request (SR), CQI, ACK/NACK, etc.) to the RN. In addition, a legacy UE (a UE which operates according to the LTE Release-8 system) regards the Type-1 relay as a legacy eNodeB (an eNodeB which operates according to the LTE Release-8 system). That is, the Type-1 relay has backward compatibility. The UEs which operates according to the LTE-A system regard the Type-1 relay as an eNodeB different from the legacy eNodeB, thereby achieving performance improvement.

The Type-1a relay has the same characteristics as the above-described Type-1 relay except that it operates as an out-band relay. The Type-1a relay may be configured so as to minimize or eliminate an influence of the operation thereof on an L1 (first layer) operation.

The Type-2 relay is an in-band relay and does not have a separate physical cell ID. Thus, a new cell is not established. The Type-2 relay is transparent to the legacy UE and the legacy UE does not recognize the presence of the Type-2 relay. The Type-2 relay can transmit a PDSCH, but does not transmit at least a CRS and a PDCCH.

In order to enable the RN to operate as the in-band relay, some resources in a time-frequency space must be reserved for the backhaul link so as not to be used for the access link. This is called resource partitioning.

The general principle of the resource partitioning in the RN will now be described. The backhaul downlink and the access downlink may be multiplexed on one carrier frequency using a Time Division Multiplexing (TDM) scheme (that is, only one of the backhaul downlink or the access downlink is activated in a specific time). Similarly, the backhaul uplink and the access uplink may be multiplexed on one carrier frequency using the TDM scheme (that is, only one of the backhaul uplink or the access uplink is activated in a specific time).

The multiplexing of the backhaul link using a FDD scheme indicates that backhaul downlink transmission is performed in a downlink frequency band and the backhaul uplink transmission is performed in an uplink frequency band. The multiplexing of the backhaul link using the TDD scheme indicates that the backhaul downlink transmission is performed in a downlink subframe of the eNodeB and the RN and the backhaul uplink transmission is performed in an uplink subframe of the eNodeB and the RN.

In the in-band relay, for example, if the backhaul downlink reception from the eNodeB and the access downlink transmission to the UE are simultaneously performed in a predetermined frequency band, the signal transmitted from the transmitter of the RN may be received by the receiver of the RN and thus signal interference or RF jamming may occur in the RF front end of the RN. Similarly, if the access uplink reception from the UE and the backhaul uplink transmission to the eNodeB are simultaneously performed in a predetermined frequency band, signal interference may occur in the RF front end of the RN. Accordingly, it is difficult to implement the simultaneous transmission and reception in one frequency band at the RN unless the received signal and the transmitted signal are sufficiently separated (for example, unless the transmission antennas and the reception antennas are sufficiently separated from each other (for example, on the ground or under the ground) in terms of geographical positions).

Figure 10:
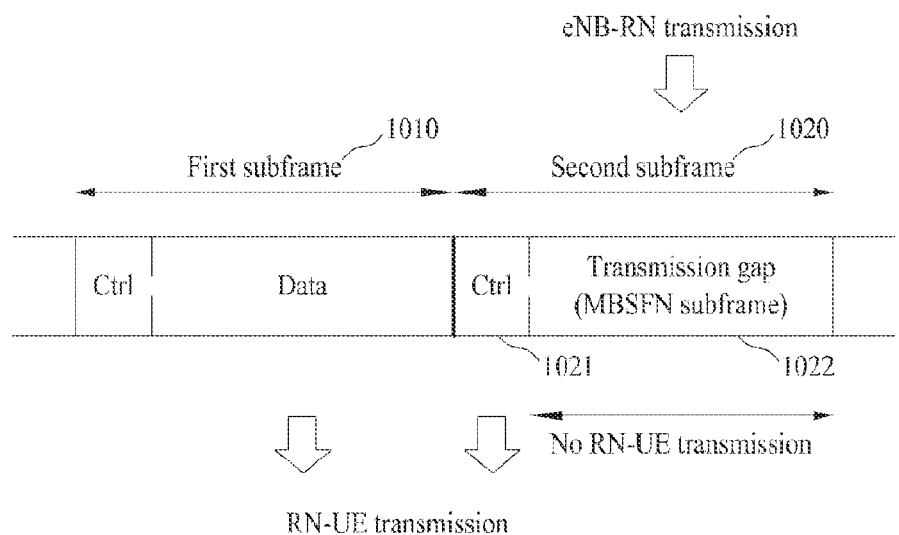
FIG. 10 is a diagram illustrating a transmission from a relay to a UE and a downlink transmission from a base station to a relay.

As a method for solving the signal interference, the RN operates so as not to transmit a signal to the UE while a signal is received from the donor cell. That is, a gap may be generated in the transmission from the RN to the UE and any transmission from the RN to the UE (including the legacy UE) may not be performed during such a gap. In FIG. 10, a first subframe 1010 is a general subframe, in which a downlink (that is, access downlink) control signal and data is transmitted from the RN to the UE, and a second subframe 1020 is an Multicast Broadcast Single Frequency Network (MBSFN) subframe, in which a control signal is transmitted from the RN to the UE in a control region 1021 of the downlink subframe, but any signal is not transmitted from the RN to the UE in the remaining region 1022 of the downlink subframe. Since the legacy UE expects the transmission of the PDCCH in all downlink subframes (that is, the RN needs to enable the legacy UEs within its own area to receive the PDCCH in every subframe so as to perform a measurement function), for the correct operation of the legacy UEs, it is necessary to transmit the PDCCH in all the downlink subframes. Accordingly, even on the subframe (the second subframe 1020)) set for the transmission of the downlink (that is, the backhaul downlink) from the eNodeB to the RN, the RN needs to transmit the access downlink in first N (N=1, 2 or 3) OFDM symbol intervals of the subframe, without receiving the backhaul downlink. Since the PDCCH is transmitted from the RN to the UE in the control region 1021 of the second subframe, it is possible to provide backward compatibility to the legacy UE served by the RN. While any signal is not transmitted from the RN to the UE in the remaining region 1022 of the second subframe, the RN may receive the signal transmitted from the eNodeB. Accordingly, the resource partitioning disables the in-band RN to simultaneously perform the access downlink transmission and the backhaul downlink reception.

The second subframe 1022 using the MBSFN subframe will now be described in detail. The MBSFN subframe is for a multimedia broadcast and multicast service (MBMS) in principle and MBMS means a service for simultaneously transmitting the same signal by several cells. The control region 1021 of the second subframe may be a RN non-hearing interval. The RN non-hearing interval refers to an interval in which the RN does not receive a backhaul downlink signal and transmits an access downlink signal. This interval may be set to 1, 2 or 3 OFDM lengths as described above. The RN performs the access downlink transmission to the UE in the RN non-hearing interval 1021 and performs the backhaul downlink reception from the eNodeB in the remaining region 1022. At this time, since the RN cannot simultaneously perform the transmission and reception in the same frequency band, it takes a certain length of time to switch the RN from the transmission mode to the reception mode. Accordingly, it is necessary to set a guard time (GT) to switch the RN from the transmission mode to the reception mode in a first portion of the backhaul downlink reception region 1022. Similarly, even when the RN receives the backhaul downlink from the eNodeB and transmits the access downlink to the UE, a guard time (GT) to switch the RN from the reception mode to the transmission mode may be set. The length of the guard time may be set to values of the time domain, for example, values of k (k≥1) time samples Ts or one or more OFDM symbol lengths. Alternatively, if the backhaul downlink subframes of the RN are consecutively set or according to a predetermined subframe timing alignment relationship, the guard time of a last portion of the subframes may not be defined or set. Such a guard time may be defined only in the frequency domain set for the transmission of the backhaul downlink subframe, in order to maintain backward compatibility (the legacy UE cannot be supported if the guard time is set in the access downlink interval). The RN can receive a PDCCH and a PDSCH from the eNodeB in the backhaul downlink reception interval 1022 except for the guard time. Such PDCCH and the PDSCH are physical channels dedicated for RN and thus may be represented by an R-PDCCH (Relay-PDCCH) and an R-PDSCH (Relay-PDSCH).

Downlink Measurement

In order to enable the eNodeB to support handover operation or inter-cell interference coordination, the UE needs to perform downlink measurement and report a result to the eNodeB. Downlink measurement includes various measurement methods such as measurement for radio link monitoring (RLM), measurement for channel state information (CSI) report and measurement for radio resource management (RRM), and measurement values.

Measurement for RLM may include downlink measurement used to detect radio link failure (RLF) and to search for a new radio link, for example. Measurement for CSI report may include measurement for enabling a UE to measure downlink channel quality to select/compute and report an appropriate rank indicator, precoding matrix indicator and channel quality indicator, for example. Measurement for RRM may include measurement for determining handover of a UE, for example.

Measurement for RRM may include measurement of reference signal received power (RSRP), reference signal received quality (RSRQ), received signal strength indicator (RSSI), etc.

RSRP is defined as a linear average of power of resource elements for carrying a cell-specific RS (CRS) within a measured frequency bandwidth. A UE may detect the CRS transmitted in a state of being mapped to a specific resource element so as to determine the RSRP. A CRS R0 for antenna port 0 may be used to compute the RSRP. If the UE may reliably detect a CRS R1 for antenna port 1, the RSRP may be determined using R0 and R1. For details of the CRS, refer to the description of FIG. 7 and the relevant standard document (e.g., 3GPP TS36.211).

RSRQ is defined as a value obtained by dividing a product of RSRP and the number N of resource blocks (RBs) within a measured frequency bandwidth by "E-UTRA carrier RSSI" (that is, RSRQ=NxRSRP/E-UTRA carrier RSSI)). A numerator (NxRSRP) and a denominator (E-UTRA carrier RSSI) are measured with respect to the same RB set.

"E-UTRA carrier RSSI" includes a linear average of total receive power measured by a UE only at OFDM symbols including a reference symbol for antenna port 0 (that is, CRS for antenna port 0) with a measurement bandwidth over N RBs with respect to signals received from all sources including co-channel serving and non-serving cell, neighboring channel interference and thermal noise.

"UTRA FDD carrier RSSI" is defined as received wideband power including noise and thermal noise generated by a receiver within a bandwidth defined by a receiver pulse generation filter.

"UTRA TDD carrier RSSI" is defined as received wideband power including noise and thermal noise generated by a receiver within a bandwidth defined by a receiver pulse generation filter within a specific time slot.

In addition to the above description, for description of downlink channel measurement, refer to the relevant standard document (e.g., 3GPP TS36.214). Therefore, a detailed description of downlink channel measurement will be omitted for clarity of description. However, downlink channel measurement described in the above standard document is applicable to downlink channel measurement used in various embodiments of the present invention.

Downlink Measurement in Inter-Cell Interference Coordination

An example of inter-cell interference coordination will be described with reference to FIG. 11.

According to the example of inter-cell interference coordination, if one cell receives strong interference from a neighboring cell, the neighboring cell does not perform a transmission in some resource regions (or transmits a null signal or performs silencing) to eliminate/reduce interference.

As an example of silencing, an interfering cell may configure a specific subframe as an MBSFN subframe. In a downlink subframe configured as an MBSFN subframe, a signal is transmitted only in a control region and a signal is not transmitted in a data region. As another example of a silencing operation, an interfering cell may configure a specific subframe as an almost blank subframe (ABS) or ABS-with-MBSFN subframe. The ABS means a subframe which transmits only a CRS and does not transmit the other control information and data in a control region and a data region of a downlink subframe. Even in the ABS, a downlink channel and a downlink signal such as PBCH, PSS and SSS may be transmitted. The ABS-with-MBSFN subframe means the case in which a CRS of a data region is also not transmitted in the above-described ABS.

Figure 11:
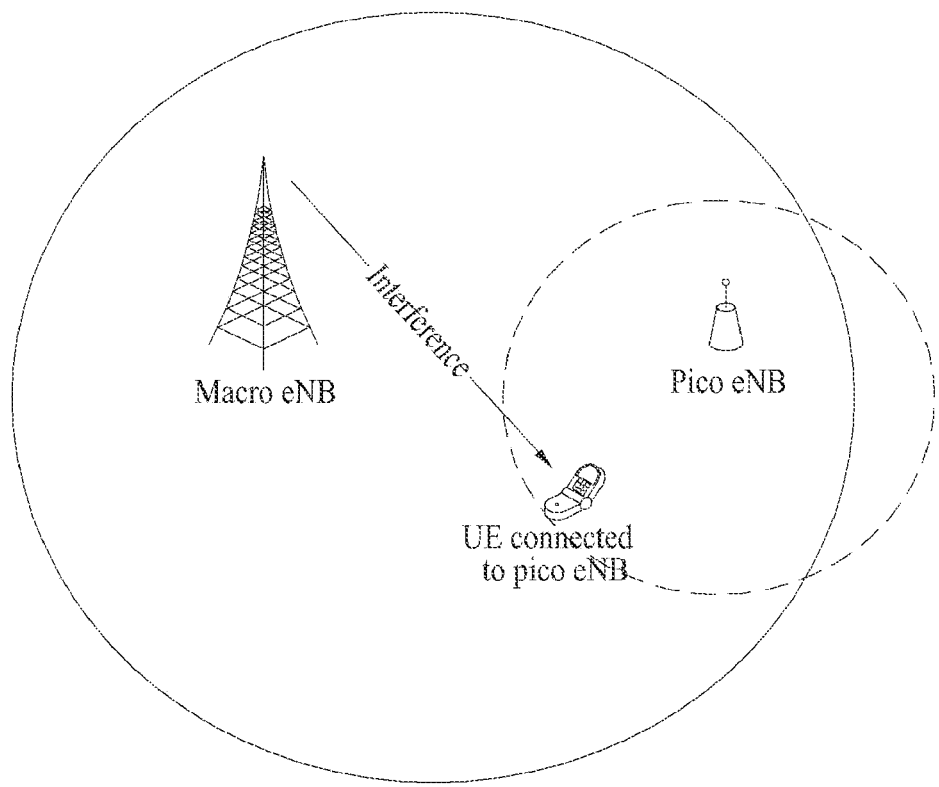
FIG. 11 is a diagram illustrating an example of inter-cell interference coordination (ICIC).

In the example of FIG. 11, a UE connected to a pico eNB with relatively weak transmit power receives strong downlink interference from a macro eNB with strong transmit power. At this time, the macro eNB may perform silencing in a downlink transmission in some subframes. In a downlink subframe in which the macro eNB performs silencing, the UE to be connected to the pico eNB may receive a signal from the pico eNB with a high signal-to-interference plus noise ratio (SINR).

Figure 12:
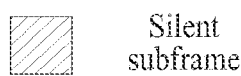
FIG. 12 is a diagram showing an example of performing ICIC of a macro base station and a pico base station in subframe units.

FIG. 12 shows an example in which inter-cell interference coordination between a macro eNB and a pico eNB is performed in subframe units. In the example of FIG. 12, the macro eNB may perform silencing in every even numbered subframe and thus the pico eNB may schedule a UE located at a cell boundary of the pico eNB with a high SINR in every even numbered subframe. In every odd numbered subframe in which the macro eNB does not perform silencing, the pico eNB may schedule a UE located at the cell center and may not schedule a UE located at a cell boundary because it is expected that interference is high.

In a state in which such inter-cell interference coordination is performed, the UE needs to perform a variety of measurements, because the eNB performs operations such as scheduling, handover and inter-cell interference coordination with respect to the UE based on the measurement result reported by the UE. Hereinafter, measurement methods according to various embodiments of the present invention will be described. In particular, RSRQ and RSSI measurement methods will be described in detail.

Embodiment 1

The present embodiment relates to a method of, at an eNB, informing a UE of resources on which the UE will perform downlink measurement. For example, if inter-cell interference coordination is applied, the RSSI may be measured with respect to specific downlink resource and the RSRQ may be computed based on the RSSI. Hereinafter, details of the present embodiment will be described.

As described above, the RSSI is defined as a sum of all power received by the UE. From the viewpoint of a specific cell, the RSSI is a value obtained by summing power of a desired signal and interference. The UE computes the RSRQ based on the RSSI measurement result and the RSRP. Briefly, this may be represented by RSRQ of the specific cell=N*RSRP/RSSI. Here, the RSRQ means a ratio of a signal of a specific cell to total receive power, rather than an SINR of the signal of the specific cell. In addition, an SINR value may be extracted using an RSRP value of a specific cell.

For example, as shown in FIG. 12, if a specific cell repeatedly performs silencing in subframe units or does not perform silencing, power received by the UE is differently measured according to subframes. That is, in the example of FIG. 12, the signal from the macro eNB is not included in the RSSI measured in the even numbered subframe but the signal from the macro eNB is included in the RSSI measured in the odd numbered subframe. Accordingly, even on the assumption that the channel does not change with time, the RSSIs measured in the even numbered subframe and the odd numbered subframe may have different values.

If the RSSI value measured by the UE of one cell (interfered cell) is changed with time according to inter-cell interference coordination (e.g., a silencing operation in a subframe unit of a neighboring cell (interfering cell), the RSSI measurement result may not be regarded as including an accurate downlink channel state.

As a method for solving such a problem, the eNB indicates a set of subframes in which the UE will perform measurement to the UE and the UE may perform measurement only in the subframes of the indicated set. The set of subframes means a set of one or more subframes. A plurality of sets of subframes may be configured and subframes belonging to each set may not overlap. If the set of subframes in which the UE will perform measurement includes some subframe(s) of a higher set, the subframe set may mean a subframe subset. Although the term subframe set is mainly used in the following description, the term subframe set may be replaced with the term subframe subset unless otherwise noted.

For example, if the UE performs RSSI measurement only in the even numbered subframe in which the macro eNB performs silencing and measures the RSRQ of the pico eNB based on the measured RSSI, the measured RSRQ may include accurate downlink quality of a subframe (even numbered subframe) scheduled to the UE located at the cell boundary of the pico eNB. However, if the RSRQ of the macro eNB is measured based on the RSSI measured in the even numbered subframe, since the signal of the macro eNB is not included in the RSSI measured in the even numbered subframe, the measured RSRQ is significantly greater than the actual RSRQ of the macro eNB and thus the RSRQ value of the macro eNB is inaccurate.

In order to solve such a problem, in the present invention, the UE measures a plurality of RSSI values and the eNB informs the UE as to which of the plurality of RSSI values is used when the RSRQ of each cell is computed. The plurality of RSSI values may be, for example, RSSI values measured with respect to different subframe sets.

In addition, the eNB may inform the UE of the subframe sets, in which the plurality of RSSI values will be measured, via a higher layer (e.g., a radio resource control (RRC) layer) signal. The higher layer signal may include information indicating each subframe set in the form of a bitmap. Information indicating the RSSI value of which subframe set is used to compute the RSRQ of each cell may be added to a list of neighboring cells to be measured by the UE.

Referring to the example of FIG. 12, the eNB may instruct the UE to measure RSSI_0 at a subframe set 0 including even numbered subframes and to measure RSSI_1 at a subframe_1 including odd numbered subframes.

In addition, the eNB may instruct the UE to compute the RSRQ of the pico cell using RSSI_0 and to compute the RSRQ of the macro cell using RSSI_1. Thus, the RSRQ of the pico cell may include link quality of a subframe in which inter-cell interference coordination is performed and the RSRQ of the macro cell may include accurate link quality expected when the UE performs handover to the macro cell.

The RSRQs of all neighboring cells may not be computed based on RSSI_0 or RSSI_1 measured only in some subframes. For example, the eNB may instruct the UE to compute the RSRQ of a specific cell based on the RSSI measured in all subframes.

In addition, the eNB may instruct the UE to report one or more RSRQ values with respect to a specific cell. For example, the eNB may instruct the UE to report a plurality of RSRQ values with respect to the pico cell of FIG. 12. One of the plurality of RSRQ values s uses an RSRQ using RSSI_0 and includes link quality of a subframe to which interference coordination is applied and another thereof uses RSSI_I and includes link quality of a subframe to which interference coordination is not applied. In this case, the pico eNB may compare two kinds of RSRQs reported by the UE and determine in which subframe the UE is preferably scheduled.

If a specific cell is detected, it may be assumed that the eNB does not indicate the RSSI value to be used with respect to the cell. In this case, the UE may not determine in which resource region (e.g., subframe set) the RSSI is measured with respect to the cell. In this case, the RSSI may be measured/computed according to a predetermined measurement method (that is, default measurement). For example, default measurement may use an RSSI for serving cell RRM or an RSSI for neighboring cell RRM. Alternatively, default measurement may measure an RSSI on all subframes. Without using a predetermined measurement method, a message indicating which RSSI is used for default measurement may be signaled from a network to the UE.

Embodiment 2

The present embodiment relates to a method of, at an eNB, informing a UE of a subframe set for RRM measurement (RSRP/RSRQ/RSSI measurement/calculation). That is, as in Embodiment 1, in order to enable the UE to perform RRM measurement per subframe set, the eNB needs to inform the UE of a subframe set for RRM measurement. Using a subframe set to be used for RLM measurement or a subframe set to be used for CSI measurement, the eNB may inform the UE of a subframe set used to perform RRM measurement.

As an example, a bitmap indicating a subframe set in which a specific RSSI value will be measured may be transmitted from the eNB to the UE via a higher layer signal. An RSRQ value may be computed base on an RSSI measurement value and a subframe set in which an RSSI is measured may be referred to as a subframe set for RRM measurement. Meanwhile, the eNB may configure a subframe set, in which the UE performs radio link monitoring (RLM) measurement, with respect to the UE. This subframe may be referred to as a subframe set for RLM measurement. A subframe set for RRM measurement and a subframe set for RLM measurement may be configured through a separate signal with respect to the UE. In particular, in case of a UE belonging to the pico eNB, the subframe set for RRM measurement for the neighboring cell may not overlap the subframe set for RRM measurement for the serving cell. This is because, while the subframe set in which the RSRQ of the serving cell may be accurately measured is a subframe set in which the neighboring cell performs silencing, a subframe set in which the RSRQ of the neighboring cell may be accurately measured is a subframe set in which the neighboring cell normally transmits a downlink signal. Alternatively, the serving set for RLM measurement for the serving cell may not overlap the subframe set in which the neighboring cell does not perform silencing. This is because, if the neighboring cell performs RLM measurement in a subframe in which silencing is not performed, the UE recognizes RLF with the serving cell due to interference from the neighboring cell and unnecessarily searches for a new radio link.

Alternatively, the eNB may inform the UE of the subframe set for RRM measurement for the neighboring cell without additional signaling. For example, the subframe set in which RSSI measurement is performed in order to compute the RSRQ of a specific neighboring cell may be configured as a subframe set (complementary set) excluding a subframe set in which measurement is performed with respect to the serving cell (a subframe set for RRM measurement for the serving cell and/or a subframe set for RLM measurement for the serving cell).

As another example, using a subframe set in which the UE will perform CSI measurement (that is, a CSI measurement subframe set), the eNB may inform the UE of a subframe set for RRM measurement. For example, the eNB may configure a plurality of subframe sets with respect to the UE via a higher layer signal. In addition, on the assumption that an inter-cell interference environment is the same in subframes belonging to the same subframe set, interference and channel measurement in these subframes may be averaged. For example, one (CSI subframe set 1) of CSI measurement subframe sets may include subframes in which an interfering neighboring cell performs silencing and another thereof (CSI subframe set 2) may include subframes in which an interfering neighboring cell performs normal transmission, such that subframes having similar channel environments are included in the same CSI measurement subframe set. In the example of FIG. 12, since even numbered subframes corresponding to CSI subframe set 1 have a channel environment, in which all macro eNBs perform silencing, in common, CSI measurement may be averaged. Since odd numbered subframes corresponding to CSI subframe set 2 have a channel environment, in which macro eNBs do not perform silencing, in common, CSI measurement may be allowed to be averaged. If the CSI measurement subframe set is configured, in CSI subframe set 2 (a subframe set in which the interfering cell performs normal transmission), it is possible to obtain a more accurate measurement result as compared to the case in which an RSSI for computing the RSRQ of the interfering cell is measured.

The UE may be informed of the subframe set for RRM measurement using the subframe set configured for CSI measurement. For example, the eNB may transmit, to the UE, a signal indicating to which of the subframes for CSI measurement the subframe set in which the RSSI to be used to compute the RSRQ of a specific cell will be measured belongs. Alternatively, the RSRQ of the neighboring cell may be defined to use an RSS measured in a specific CSI subframe set (e.g., a CSI measurement subframe set which does not include RLM and/or an RSRP/RSRQ measurement subframe of the serving cell).

Embodiment 3

The present embodiment relates to a method of defining a measurement subframe depending on whether a UE is connected to an interfered cell or an interfering cell and performing a measurement operation. In the example of FIG. 11, the case in which the UE is connected to a pico eNB and the case in which the UE is connected to the macro eNB will now be described.

First, if the UE is connected to the pico eNB, a serving cell is a pico cell which receives interference from a macro cell and a neighboring cell is a macro cell which provides interference.

In this case, measurement for the serving cell is preferably performed in a subframe in which the neighboring cell (macro cell) performs silencing. Since a subframe scheduled to the UE by the serving cell has no interference (or little interference) with the neighboring cell, measurement for the serving cell must be performed in the subframe scheduled to the UE in order to accurately apply quality of the downlink scheduled to the UE. Measurement for the neighboring cell is preferably performed in the subframe in which the neighboring cell (the macro cell) does not perform silencing, because downlink quality of the neighboring cell is accurately applied when measurement is performed in the subframe in which the neighboring cell actually performs transmission.

If the UE is connected to the macro eNB, a serving cell is a macro cell which provides interference to another cell and a neighboring cell is a pico cell which receives interference from the macro cell.

In this case, measurement for the serving cell is preferably performed in a subframe in which the serving cell (macro cell) performs silencing, because downlink quality of the serving cell is accurately applied when measurement is performed in the subframe in which the serving cell actually performs transmission. In addition, measurement for the neighboring cell is preferably performed in the subframe in which the serving cell performs silencing. When downlink quality of the neighboring cell is measured in a subframe in which the neighboring cell (pico cell) receives strong interference from the serving cell (macro cell), actual downlink quality of the neighboring cell may not be applied and downlink quality of the neighboring cell is accurately applied when measurement for the neighboring cell is performed in a subframe in which interference from the serving cell is eliminated (or reduced).

As described above, in order to accurately perform measurement for the serving cell and the neighboring cell in an inter-cell interference coordination environment, information indicating in which subframe neighboring cells do not perform silencing need to be shared between cells. Information about a subframe in which silencing is performed may be derived from information about a subframe in which silencing is not performed. Based on information about the subframe set in which silencing is performed (or is not performed), which is shared between cells, the eNB of each cell may inform the UE of measurement for which cell is performed in which subframe set.

A configuration of a subframe in which silencing is performed (or is not performed) is frequently changed but a configuration of a subframe in which RRM measurement is performed is less frequently changed. For example, RRM measurement may be performed using a time window of about 200 ms and a configuration of a silencing subframe may be changed several times within the time window. In this case, information about a subframe in which silencing is statically performed (or silencing is not performed) is shared between two cells, thereby accurately performing measurement. If a cell for performing silencing, that is, a cell causing interference, is referred to as a first cell and a cell which receives interference is a second cell, the following operation may be performed.

Accordingly, the first cell may inform the second cell of a subframe set including subframes in which silencing is not statically performed (that is, subframes in which silencing is not performed with a high probability for a long period of time) and recommend that this subframe set be used as a subframe set for measurement for the neighboring cell (that is, the first cell). In addition, the second cell may determine subframes for measurement for the serving cell (that is, the second cell) in subframes excluding the subframe set received from the first cell.

Alternatively, the first cell may inform the second cell of a subframe set including subframes in which silencing is statically performed (that is, subframes in which silencing is performed with a high probability for a long period of time) and the second cell may use this subframe set as a subframe set for measurement for the serving cell (that is, the second cell) of the UE connected thereto. In addition, the second cell may determine subframes for measurement for the neighboring cell (that is, the first cell) in subframes excluding the subframe set received from the first cell.

In order to share information about the subframe set, in which silencing is performed (or silencing is not performed), between eNBs, the eNBs may exchange such a signal via an X2 interface present in a backhaul link.

Embodiment 4

The present embodiment relates to a measurement method when inter-frequency measurement is performed. Inter-frequency measurement means measurement for a cell present in a frequency carrier other than a frequency carrier received by the UE. In this case, there is a need for definition of a method of performing RRM measurement as described above.

Since the serving cell is defined on a frequency carrier on which the UE currently operates, the serving cell is not present on a frequency carrier other than a serving carrier and all cells become neighboring cells. Accordingly, the existing measurement report operation for reporting RSRP and RSRQ defined with respect to the serving cell is not applicable. In addition, the RSSI value in the frequency of the carrier other than the serving carrier is not equal to the RSSI value measured in the frequency of the serving carrier. Accordingly, the RSSI derived from the RSRP and RSRQ reported with respect to the serving cell may not be used on the frequency carrier other than the serving carrier.

In order to solve such a problem, a UE which performs inter-frequency measurement may perform measurement for a virtual serving cell in the same manner as measurement on the serving carrier on the assumption that the virtual serving cell is present on the frequency carrier to be measured. For example, the UE may be informed of a subframe set to be used for measurement of the virtual serving cell (RLM and/or RRM measurement) along with the ID of the virtual serving cell to be used for inter-frequency measurement of the eNB. The UE may measure the RSSI on the frequency carrier other than the serving carrier using the serving set indicated by the eNB and compute and report the RSRP and RSRQ for the virtual serving cell based on the measured RSSI.

Since the network may check the RSSI of the carrier other than the serving carrier of the UE from the reported result of inter-frequency measurement, the UE may perform a basic RRM operation (e.g., a basic RSRQ estimate deriving operation) even when only the RSRP of another cell on the carrier other than the serving carrier of the UE is reported.

Embodiment 5

The present embodiment relates to a method of reporting an accurate RSRQ value for each cell by differently defining RSRQ per cell although the number of subframe sets in which a UE performs RSSI measurement is set to 1.

The above-described embodiments are based on a method of differently configuring resources (e.g., subframe sets) for an RRM measurement related operation (RSSI measurement, RSRQ calculation, etc.) for a serving cell and a neighboring cell per cell (that is, a method for respectively configuring first and second subframe sets with respect to the serving cell and the neighboring cell). Here, the first cell may be a serving cell and the second cell may be a neighboring cell, and vice versa. The present embodiment relates to a method of differently defining the RSRQ per cell while resources for the RRM measurement related operation are equally configured regardless of cell so as to perform RSRQ calculation and reporting optimal for each cell.

First, according to the existing RSRQ definition, RSRQ=N*RSRP/RSSI. According to the present embodiment, the RSRQ may be differently defined per cell. For example, a method of using an RSSI value measured with respect to specific resource (e.g., a subframe set) without change to compute an RSRQ value (that is, RSRQ=N*RSRP/RSSI) with respect to the first cell and using a value obtained by adding an RSRP value for the second cell to the RSSI value measured with respect to the same specific resource to compute an RSRQ value (that is, RSRQ=N*RSRP/(RSSI+N*RSRP)) with respect to the second cell may be used. Since the RSRQ may be a ratio of power (numerator of RSRQ) of a signal of a specific cell to overall receive power (denominator of RSRQ), the RSRP of the second cell is included in overall receive power in order to apply overall receive power when inter-cell interference coordination is applied. Therefore, it is possible to more accurately compute the RSRQ value. This may be expressed by RSRQ=N*RSRP/(RSSI+f(RSRP)).

An indication indicating which RSRQ calculation scheme is applied to each cell may be included in a list of neighboring cells (that is, a list of neighboring cells to be measured) provided to the UE by the eNB.

If the serving cell receives interference and the neighboring cell provides interference, the RSRQ calculation scheme for the neighboring cell and the RSRQ calculation scheme for the serving cell may be differently defined. Hereinafter, methods of defining and using different RSRQ calculation schemes per cell will be described using various examples.

Embodiment 5-1

If the existing RSRQ calculation method is used, since the RSRQ of the interfering cell may not be accurately computed in a subframe in which a neighboring cell (a cell which provides interference) performs silencing, a new RSRQ calculation scheme may be defined and used. For example, in the example of FIG. 12, the eNB may inform the UE of a subframe set including even numbered subframes as resources on which RRM measurement will be performed. Then, the UE performs RRM measurement for the serving cell and the neighboring cell only in the even numbered subframe. In this case, the eNB may instruct the UE to perform RSRQ calculation with respect to the serving cell (the pico cell which receives interference) according to the existing RSRQ definition (RSRQ=N*RSRP/RSSI) and to perform RSRQ calculation with respect to the neighboring cell (the macro cell which provides interference) according to the new RSRQ definition (RSRQ=N*RSRP/(RSSI+N*RSR)). Thus, it is possible to increase accuracy of the RSRQ calculation result for the macro cell of the UE. This is because the RSSI value measured in the even numbered subframes excludes transmit power of the macro cell so as not to accurately apply overall receive power (that is, the denominator of the RSRQ calculation) of the macro cell but a sum of the overall receive power for the macro cell may become close to an actual value if the RSRP of the macro cell is added to the RSSI values measured in the even numbered subframes.

If the RSRQ of the interfering cell is computed in the subframe in which the interfering cell performs silencing, the RSRP of the interfering cell may be added to the denominator (that is, overall receive power) of RSRQ calculation so as to more accurately compute the RSRQ of the interfering cell. For example, RSRQ=N*RSRP/(RSSI+ N*a*RSRP) may be defined. Here, a is a coefficient for correcting a difference between CRS transmit power obtained from an RSRP measurement value of a specific cell and actual transmit power changed according to data load and may have a value of $0 \leq a < 1$ (a being a real number).

Embodiment 5-2

If the serving cell receives interference, RSRQ=N*RSRP/ (RSSI−N*b*RSRP_aggressor) may be defined as an RSRQ calculation method for more accurately measuring the RSRQ of the serving cell. Here, RSRP_aggressor means an RSRP value of an interfering cell which provides strong interference to the UE. The eNB may inform the UE of information about the interfering cell via a higher layer signal.

More specifically, assume that the RSSI is defined as a receive power value of an OFDM symbol on which the serving cell transmits a CRS and a silencing operation of the interfering cell is performed by configuring a specific downlink subframe as an ABS subframe. In addition, assume that a subframe boundary of the interfering cell and a subframe boundary of the serving cell (interfered cell) match (that is, the CRS transmission OFDM symbol of the serving cell and the CRS transmission OFDM symbol of the interfering cell are transmitted at the same time). In this case, even when silencing of the interfering cell is performed in a subframe in which the UE measures the RSSI, since the interfering cell transmits the CRS in that subframe (unless the interfering cell configures a subframe, in which silencing is performed, as an MBSFN subframe), power of the CRS of the interfering cell is included in the RSSI value measured by the UE. In this case, in order to compute the RSRQ of the serving cell in a state in which there is no interference due to the CRS of the interfering cell, it is necessary to remove the power of the CRS of the interfering cell from the RSSI value measured by the UE. For removal, if the RSRQ calculation scheme is defined as RSRQ=N*RSRP/(RSSI− N*b*RSRP_aggressor), the power RSRP_aggressor due to the CRS of the interfering cell is subtracted from the RSSI value measured by the UE, such that the RSRQ value of the serving cell excluding interference of the interfering cell may be derived. Here, the value b is a coefficient for deriving power of the CRS from the RSRP of the interfering cell and may be appropriately selected.

Embodiment 5-3

For more accurate calculation of the RSRP of the serving cell, the UE may compute a weighted average of RSRQ values acquired according to various calculation schemes. For example, in case of a subframe of normal CP (one downlink subframe includes 14 OFDM symbols), a CRS is not transmitted in 10 OFDM symbols of one subframe and this OFDM symbol is referred to as a first type OFDM symbol. The number of CRS transmission OFDM symbols is 4 and this OFDM symbol is referred to as a second type OFDM symbol. When the UE computes the RSRQ of the serving cell, different RSRQ calculation schemes are applicable in consideration of the type of each OFDM symbol. In the following example, assume that the RSSI is defined as a receive power value of an OFDM symbol on which the serving cell transmits a CRS, a silencing operation of the interfering cell is performed by an ABS subframe configuration scheme, and a subframe boundary of the interfering cell and a subframe boundary of the serving cell (interfered cell) match.

More specifically, if the RSRQ of the serving cell for the first type OFDM symbol on which the CRS of the serving cell is not transmitted is RSRQ1, RSRQ1=N*RSRP/(RSSI−N*b*RSRPaggressor) may be defined and computed, because the CRS of the interfering cell is not present in the first type OFDM symbol and the interfering cell does not transmit data in the first type OFDM symbol. That is, in order to accurately apply an actual situation in which the CRS of the interfering cell is not present, power of the CRS of the interfering cell is subtracted from overall transmit power upon RSRQ calculation. If the RSRQ of the serving cell for the second type OFDM symbol on which the CRS of the serving cell is transmitted is RSRQ2, RSRQ2=N*RSRP/(RSSI) may be defined and computed. Although the interfering cell performs a silencing operation, since the CRS of the interfering cell is present in the second type OFDM symbol, it is possible to apply an accurate RSRQ in the second type OFDM symbol by using the RSSI including power of the CRS of the interfering cell.

The UE may compute a weighted average of RSRQ1 and RSRQ2 and determines a result as a final RSRQ value of the serving cell. That is, this may be expressed by RSRQ=w1*RSRQ1+w2*RSRQ2. Here, w1 is defined as the number of first type OFDM symbols among a total number of OFDM symbols and w2 is defined as the number of second type OFDM symbols among a total number of OFDM symbols. In the above example, w1=10/14 and w2=4/14.

The eNB may inform the UE as to which of the various RSRQ calculation schemes proposed in the above-described embodiments is used via higher layer signaling (e.g., RRC signaling).

Embodiment 6

The present embodiment relates to a method of applying various examples of the above-described RSRQ calculation schemes per cell. Fundamentally, the UE performs RSSI measurement according to the existing definition (that is, a linear average of overall receive power of a CRS transmission OFDM symbol is measured). Resources (e.g., a subframe set) on which the UE measures the RSSI may be a specific set by a higher layer signal transmitted by the eNB. If the RSRQ of a cell i is expressed by RSRQ(i), RSRQ(i) may be defined as shown in Equation 15.

RSRQ($i$)=$N$*RSRP($i$)/(RSSI+$N$*$c(i)$*RSRP_aggressor)  Equation 15

In Equation 15, N denotes the number of resource blocks within a measured frequency bandwidth, RSRP(i) denotes an RSRP value of a cell i and RSSI is a linear average of overall receive power in a CRS transmission OFDM symbol.

In Equation 15, RSRP_aggressor may be defined by one of the following various schemes. For example, RSRP_aggressor may be defined as an RSRP value of a non-serving cell having a largest RSRP value among cells present on the same carrier. As another example, RSRP_aggressor may be defined as an RSRP value of a specific cell specified by the eNB through a higher layer signal. As another example, RSRP_aggressor may be transmitted from the eNB to the UE. In this case, it is possible to more simply implement the operation of the UE.

In Equation 15, a variable c(i) is a weight for determining how much RSRP_aggressor is applied to calculation of RSRQ(i) and the value of c(i) may be changed according to selection of various RSRQ calculation schemes proposed in Embodiment 5. The eNB may inform the UE of the variable c(i) through a higher layer signal. Alternatively, c(i) may be determined using a cell identifier cell_ID of a cell subjected to RSRQ calculation. For example, the variable c(i) may have a value of a positive number, a negative number or 0 (that is, the value of c(i) may be set to one of {+1, −1, 0}). Hereinafter, examples of RSRQ calculation according to the value of c(i) will be described with reference to FIG. 13.

Figure 13:
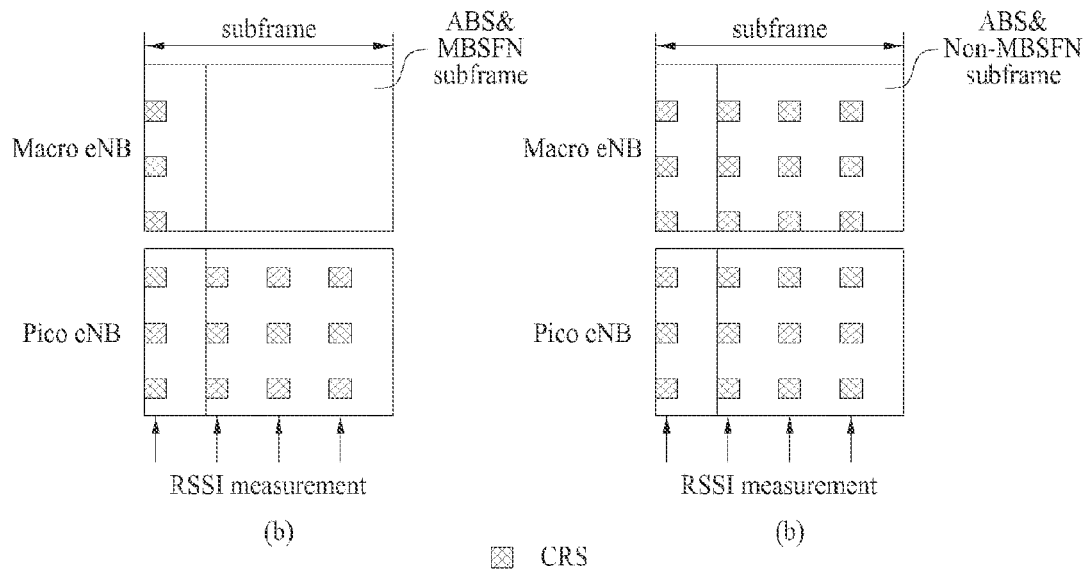
FIG. 13 is a diagram illustrating a method of performing more accurately downlink measurement according to ICIC types.

A method of performing more accurate downlink measurement according to an inter-cell interference coordination type will be described with reference to FIG. 13. In the example of FIG. 13, assume that a macro cell provides interference to a pico cell. FIG. 13($a$) shows an example in which a macro cell performs silencing for configuring an ABS-with-MBSFN subframe (that is, only a CRS is transmitted in a control region of a downlink subframe and both a CRS and data are not transmitted in a data region) and FIG. 13($b$) shows an example in which a macro cell does not configure an MBSFN subframe but performs silencing for configuring an ABS subframe (that is, only a CRS is transmitted in both a control region and a data region of a downlink subframe).

An RSRQ calculation scheme in which the variable c(i) is a positive number in Equation 15 is suitable for the case in which a measured RSSI is regarded as being underestimated as compared to a necessary RSSI and power is added to the measured RSSI in order to compensate for underestimation so as to derive a value close to an RSRQ value to be measured. For example, in FIG. 13($a$), if the UE of the pico cell measures an RSRQ value of the macro cell (that is, if an accurate RSRQ value is computed when the UE of the pico cell performs handover to the macro cell to be scheduled by the macro cell), c(i) having a positive value is applicable. In the example of FIG. 13($a$), if the UE of the pico cell measures an RSSI value in a CRS transmission OFDM symbol, transmit power of the macro cell is not included in the measured RSSI on the CRS transmission OFDM symbol of the data region of the downlink subframe. In other words, in order to enable the UE of the pico cell to compute the RSRQ value of the macro cell, it is necessary to compute the RSRQ of the macro cell based on the RSSI when the macro cell actually performs downlink transmission. The RSSI measured when the macro cell performs silencing as shown in FIG. 13($a$) is underestimated as compared to transmit power of the macro cell when the macro cell actually performs transmission. Accordingly, in order to compensate for underestimation, the RSRQ computed by setting c(i) to a positive number in Equation 15 may accurately indicate the RSRQ value of the macro cell when the macro cell actually performs transmission.

An RSRQ calculation scheme in which the variable c(i) is a negative number in Equation 15 is suitable for the case in which a measured RSSI is regarded as being overestimated as compared to a necessary RSSI and power is subtracted from the measured RSSI in order to compensate for overestimation so as to derive a value close to an RSRQ value to be measured. For example, in FIG. 13($b$), if the UE of the pico cell measures an RSRQ value of the pico cell (that is, if an accurate RSRQ value is computed when the UE of the pico cell is scheduled by the pico cell when there is no interference of the macro cell), c(i) having a negative value is applicable. In the example of FIG. 13($b$), if the UE of the pico cell measures an RSSI value in a CRS transmission OFDM symbol, transmit power of the CRS of the macro cell is included in the measured RSSI. In other words, in order to enable the UE of the pico cell to compute the RSRQ of the pico cell, it is necessary to compute the RSRQ value of the pico cell based on the RSSI when the macro cell has completely performed silencing. The RSSI measured when the macro cell transmits a CRS in the data region of the downlink subframe as shown in FIG. 13(b) is overestimated as compared to transmit power of the macro cell when the macro cell has completely performed silencing. Accordingly, in order to compensate for overestimation, the RSRQ computed by setting $c(i)$ to a negative number in Equation 15 may accurately indicate the RSRQ value of the pico cell when the macro cell has completely performed silencing.

An RSRQ calculation scheme in which the variable $c(i)$ is 0 in Equation 15 corresponds to the case in which the existing RSRQ definition is used without change. For example, the UE of the pico cell measures the RSSI value in an ABS-with-MBSFN subframe in which the macro cell does not transmit a CRS and data as shown in FIG. 13(a) and RSRQ (=N*RSRP/(RSSI+0)) computed without compensation for the RSSI may include the accurate RSRQ value of the pico cell when the macro cell performs silencing.

If the eNB configures a subframe set, on which downlink measurement will be performed, with respect to the UE, an appropriate RSRQ calculation scheme may be determined in consideration of the type of an inter-cell interference coordination operation of a neighboring cell in the subframe set and information indicating downlink quality of which state is included in an RSRQ to be computed by the UE. The eNB may inform the UE of the determined RSRQ calculation scheme and the UE may perform downlink measurement using the RSRQ calculation scheme indicated in the subframe set indicated by the eNB.

Although a method of compensating for the RSSI measurement value based on the RSRP measurement value when the UE performs RRM measurement and then deriving the RSRQ indicating overall signal quality is described above, such a principle is equally applicable to a process of a CSI measurement/reporting process for determining a data transfer rate. That is, the UE measures the intensity of interference (or a signal including an interference signal) using specific resources as in the RSSI of RRM, compensates for the interference measurement value based on the measurement value obtained via a specific reference signal as in the RSSI of RRM, and derives a CSI indicating signal quality.

Figure 14:
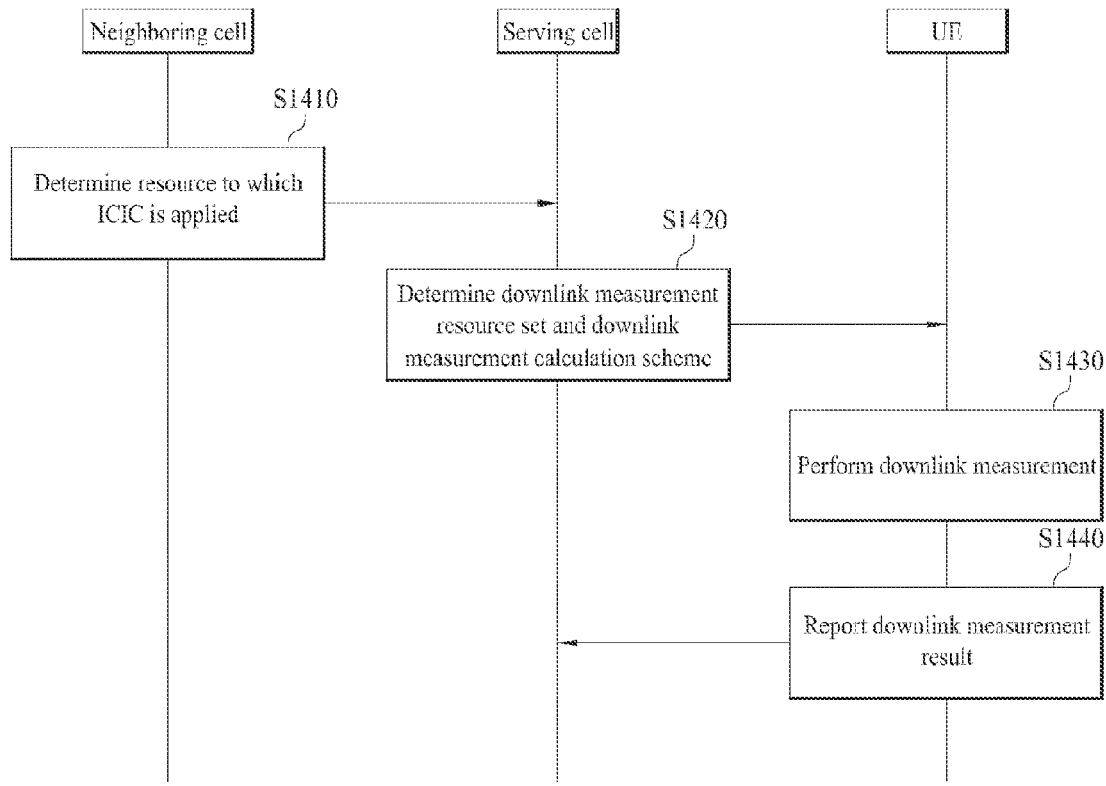
FIG. 14 is a flowchart illustrating a downlink measurement method according to an embodiment of the present invention.

FIG. 14 is a flowchart illustrating a downlink measurement method according to an embodiment of the present invention.

In step S1410, a resource set to which inter-cell interference coordination (ICIC) of a neighboring cell is applied may be determined and configuration information thereof may be transmitted to a serving cell via an X2 interface. The resource set to which ICIC is applied may be set as a downlink subframe set.

In step S1420, the serving cell determines a resource set, on which a UE thereof will perform downlink measurement, based on the configuration information of the resource set to which ICIC of the neighboring cell is applied, determines a downlink measurement calculation scheme to be applied to the downlink measurement resource set and transmits the determined result to the UE. The resource set, on which downlink measurement will be performed, may be set as a downlink subframe set and may include, for example, a part (subset) of subframes configured as an ABS (or statically configured as an ABS) by the neighboring cell.

In step S1430, the UE may apply a downlink measurement calculation scheme indicated in the received downlink measurement resource set and perform downlink measurement.

In step S1440, the UE may report a downlink measurement result to the eNB (serving cell) and the eNB may determine and indicate an appropriate operation such as UE scheduling, handover, etc. in consideration of the downlink measurement result.

The UE may perform downlink measurement (e.g., RRM measurement) of a specific cell on the downlink measurement resource set indicated or configured by the eNB and perform downlink measurement according to the RRM measurement/calculation scheme indicated by the eNB with respect to the specific cell. The downlink measurement resource set indicated/configured by the eNB may be a subframe set distinguished per cell as described in the above-described embodiments and the same RRM measurement/calculation scheme indicated/configured by the eNB is applicable to all cells (without distinction). Alternatively, the downlink measurement resource set indicated/configured by the eNB may be the same subframe set with respect to all cells (without distinction) and different RRM measurement/calculation schemes indicated/configured by the eNB are applied per cell.

In the downlink measurement method according to the present invention, which are described with reference to FIG. 14, details of the above-described various embodiments of the present invention may be independently applied or 2 or more embodiments may be applied at the same time. And, in this case, overlapping details will be omitted from the description for simplicity and clarity.

Figure 15:
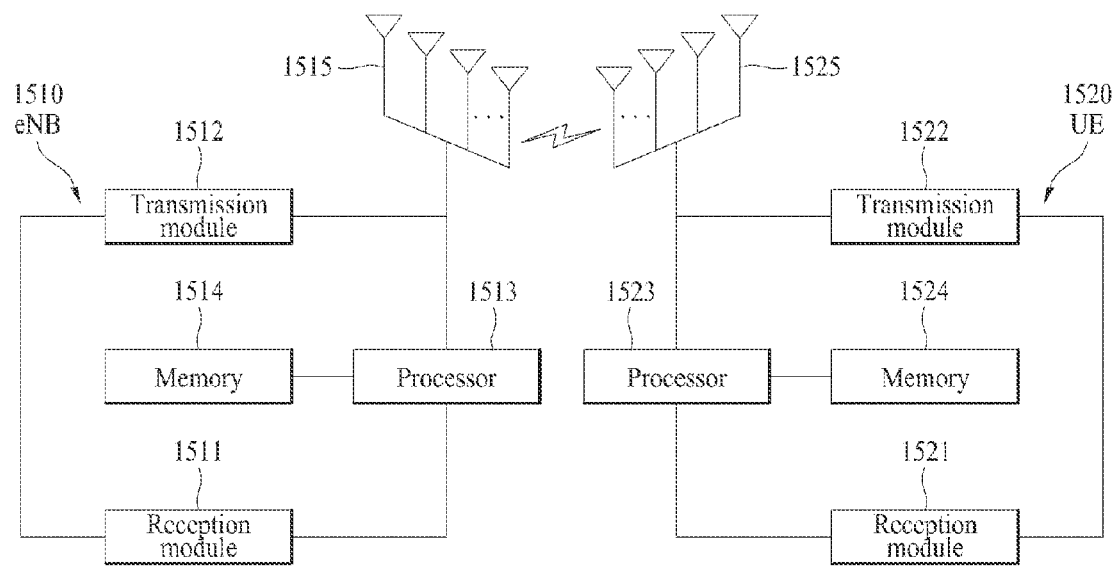
FIG. 15 is a diagram showing the configuration of a base station device and a user equipment device according to an embodiment of the present invention.

FIG. 15 illustrates a base station device and a user equipment device according to an embodiment of the present invention.

Referring to FIG. 15, the base station device 1510 according to the present invention may include a reception module 1511, a transmission module 1512, a processor 1513, a memory 1514, and a plurality of antennae 1515. The plurality of antennae 1515 indicates that the base station device supports MIMO transmission and reception. The reception module 1511 may receive various signals, data, and information on an uplink from the user equipment. The transmission module 1512 may transmit various signals, data, and information on a downlink to the user equipment. The processor 1513 may control the overall operations of the base station device 1510.

The base station device 1510 according to the embodiment of the present invention may be configured to support downlink measurement. The processor 1513 of the base station device may be configured to transmit the configuration of the resource set, on which downlink measurement will be performed, to the UE via the transmission module 1512. The processor 1513 may be configured to receive the downlink measurement result of the configured resource set from the UE via the reception module 1511. The configuration of the resource set, on which downlink measurement will be performed, may be determined by the base station (eNB) based on the resource set on which the neighboring cell performs inter-cell interference coordination.

The processor 1513 of the base station device 1510 performs a calculation/operation process on information received by the base station device 1510, information that is to be transmitted outside, and so on. The memory 1514 may store the operated information for a predetermined period of time, and the memory 1514 may be replaced by another element, such as a buffer (not shown).

Referring to FIG. 15, the user equipment device 1520 according to the present invention may include a reception module 1521, a transmission module 1522, a processor 1523, a memory 1524, and a plurality of antennae 1525. The plurality of antennae 1525 indicates that the user equipment device supports MIMO transmission and reception. The reception module 1521 may receive various signals, data, and information on a downlink from the base station. The transmission module 1522 may transmit various signals, data, and information on an uplink to the base station. The processor 1523 may control the overall operations of the user equipment device 1520.

The user equipment device 1520 according to the embodiment of the present invention may be configured to perform downlink measurement. The processor 1523 of the user equipment device may be configured to receive the configuration of the resource set, on which downlink measurement will be performed, from the base station via the reception module 1521. The processor 1523 may be configured to perform downlink measurement on the configured resource set. The configuration of the resource set, on which downlink measurement will be performed, may be determined by the base station (eNB) based on the resource set on which the neighboring cell performs inter-cell interference coordination.

Moreover, the processor 1523 of the user equipment device 1520 performs a calculation/operation process on information received by the user equipment device 1520, information that is to be transmitted outside, and so on. The memory 1524 may store the operated information for a predetermined period of time, and the memory 1524 may be replaced by another element, such as a buffer (not shown).

In the above-described detailed configuration of the base station device 1510 and the user equipment device 1520, details of the above-described various embodiments of the present invention may be independently applied or 2 or more embodiments may be applied at the same time. In this case, overlapping details will be omitted from the description for simplicity and clarity.

Furthermore, the description of the base station device 1510 of FIG. 15 may also be equally applied to a relay station device functioning as a downlink transmission subject or an uplink reception subject. The description of the user equipment device 1520 of FIG. 15 may also be equally applied to a relay station device functioning as an uplink transmission subject or a downlink reception subject.

The above-described embodiments of the present invention can be implemented by a variety of means, for example, hardware, firmware, software, or a combination of them.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software codes may be stored in a memory unit so that it can be driven by a processor. The memory unit is located inside or outside of the processor, so that it can communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, it will be obvious to those skilled in the art that claims that are not explicitly cited in the appended claims may be presented in combination as an exemplary embodiment of the present invention or included as a new claim by subsequent amendment after the application is filed.

The embodiments of the present invention are applicable to various mobile communication systems.

What is claimed is:

1. A method of supporting downlink measurement of a user equipment in a wireless communication system, the method performed by a base station and comprising:
   receiving, by the base station, an X2 interface message from a neighbor base station which performs inter-cell interference coordination with the base station, the X2 interface message including first information on a subset of almost blank subframes (ABSs) of the neighbor base station among a set of subframes included in a predefined time window;
   transmitting, by the base station to the user equipment, second information indicating one or more subframes on which downlink measurement is to be performed by the user equipment, the second information determined by the base station in consideration of the first information; and
   receiving, by the base station from the user equipment, a result of the downlink measurement performed in the one or more subframes configured by the second information.

2. A base station for supporting downlink measurement of a user equipment in a wireless communication system, the base station comprising:
   a reception module configured to receive an X2 message from a neighbor base station which performs inter-cell interference coordination with the base station, the X2 message including first information on a subset of almost blank subframes (ABSs) of the neighbor base station among a set of subframes included in a predefined time window;
   a transmission module configured to transmit second information indicating one or more subframes on which downlink measurement is to be performed by the user equipment, the second information determined by the base station in consideration of the first information; and
   a processor configured to control the reception module and the transmission module, wherein the processor is further configured to receive, from the user equipment through the reception module, a result of the downlink measurement performed in the one or more subframes configured by the second information.

* * * * *